United States Patent
Bouazizi et al.

(10) Patent No.: US 11,979,439 B2
(45) Date of Patent: May 7, 2024

(54) METHOD AND APPARATUS FOR MAPPING DASH TO WEBRTC TRANSPORT

(71) Applicant: QUALCOMM Incorporated, San Diego, CA (US)

(72) Inventors: Imed Bouazizi, Frisco, TX (US); Thomas Stockhammer, Bergen (DE); Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/306,943

(22) Filed: Apr. 25, 2023

(65) Prior Publication Data

US 2023/0353609 A1 Nov. 2, 2023

Related U.S. Application Data

(60) Provisional application No. 63/363,707, filed on Apr. 27, 2022.

(51) Int. Cl.
| | | |
|---|---|---|
| *H04L 65/1108* | (2022.01) | |
| *H04L 9/40* | (2022.01) | |
| *H04L 65/1069* | (2022.01) | |

(52) U.S. Cl.
CPC ...... *H04L 65/1108* (2022.05); *H04L 63/0428* (2013.01); *H04L 65/1069* (2013.01)

(58) Field of Classification Search
CPC .......................... H04L 65/1069; H04L 65/1108
See application file for complete search history.

(56) References Cited

U.S. PATENT DOCUMENTS

| | | | | |
|---|---|---|---|---|
| 6,658,476 B1* | 12/2003 | Van | ................. | H04L 69/329 709/230 |
| 2015/0304379 A1* | 10/2015 | Ezell | ................. | H04L 65/4038 709/219 |
| 2018/0152669 A1* | 5/2018 | Feng | ................. | H04L 65/403 |
| 2022/0321926 A1* | 10/2022 | Yip | ................. | H04L 65/1016 |
| 2023/0126229 A1* | 4/2023 | Azuolas | ........... | H04N 21/23106 709/231 |

OTHER PUBLICATIONS

Zhao et al. Low Delay MPEG DASH Streaming over the WebRTC Data Channel (Year: 2006).*
Stockhammer et al. DASH-IF Report: DASH and WebRTC-Based Streaming, Retrieved from the Wayback Machine, May 7, 2022 (Year: 2022).*
Marrying WebRTC and DASH for Interactive Streamining, Mar. 21, 2022 (Year: 2022).*
Zhao et al. Low Delay Streaming of DASH Content with WebRTC Data Channel, 2016 (Year: 2016).*

(Continued)

*Primary Examiner* — Joshua Joo
(74) *Attorney, Agent, or Firm* — The Marbury Law Group, PLLC

(57) ABSTRACT

Embodiments include systems and methods for delivering Dynamic Adaptive Streaming Over Hypertext Transfer Protocol (DASH) content through Web Real-Time Communication (WebRTC). Various embodiments may enable the mapping of DASH content onto WebRTC transport sessions. Various embodiments may enable the reuse of encryption contexts.

26 Claims, 12 Drawing Sheets

(56) References Cited

OTHER PUBLICATIONS

International Search Report and Written Opinion - PCT/US2023/019936 - ISA/EPO - 2023-07-12 (2202600WO) 13 pages.
Stockhammer T., et al., "DASH-IF Report: DASH and WebRTC-Based Streaming: webRTC", Mar. 1, 2022, XP093052051, pp. 1-38.
Zhao S., et al., "Low Delay Mpeg Dash Streaming Over the WebRTC Data Channel", 2016 IEEE International Conference on Multimedia Expo Workshops, Jul. 11, 2016, XP032970902, 6 Pages.

* cited by examiner

METHOD AND APPARATUS FOR MAPPING DASH TO WEBRTC TRANSPORT

RELATED APPLICATIONS

This application claims the benefit of priority to U.S. Provisional Application No. 63/363,707 entitled "Managing A Reordering Timer" filed Apr. 27, 2022, the entire contents of which are hereby incorporated by reference for all purposes.

BACKGROUND

Long Term Evolution (LTE), 5G new radio (NR) (5GNR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, and provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include systems and methods for delivering Dynamic Adaptive Streaming Over Hypertext Transfer Protocol (DASH) content through Web Real-Time Communication (WebRTC). Various aspects may enable the mapping of DASH content onto WebRTC transport sessions. Various aspects may enable the reuse of encryption contexts.

Various aspects may include methods performed by a processor of an endpoint computing device for receiving Dynamic Adaptive Streaming Over Hypertext Transfer Protocol (DASH) content through Web Real-Time Communication (WebRTC), including sending a request to a server for a manifest file for DASH content, and receiving a reply to the request from the server, the reply including the manifest file for the DASH content and an indication that WebRTC is available for use in delivering the DASH content.

Some aspects may further include determining one or more DASH content components for the DASH content to be consumed based at least in part on parsing the manifest file, selecting WebRTC for receiving the one or more DASH content components for the DASH content based at least in part on the indication that WebRTC is available for use in delivering the DASH content, and sending an offer to establish a WebRTC session to the server including an indication of the one or more DASH content components for the DASH content. Some aspects may further include receiving an acceptance message establishing the WebRTC session from the server, in which the acceptance message may include an object indicating a mapping between each respective media stream of the WebRTC session and that respective media stream's assigned one of the one or more DASH components for the DASH content. Some aspects may further include receiving the DASH content from the server via at least one respective media stream of the WebRTC session.

In some aspects, the offer to establish the WebRTC session further may include an indication of the one or more streaming attributes. In some aspects, the one or more streaming attributes are one or more of a bandwidth, a width, a height, a frame rate, a codec, and a file type.

In some aspects, the indication that WebRTC is available for use in delivering the DASH content may include an indication that the server is WebRTC capable and an indication of a signaling endpoint to use in a WebRTC session. In some aspects, the indication that WebRTC is available for use in delivering the DASH content further may include an indication of a signaling protocol to use for establishing the WebRTC session.

In some aspects, the one or more DASH content components for the DASH content are one or more AdaptationSets for the DASH content. In some aspects, the manifest file for DASH content may be a Media Presentation Description.

Some aspects may further include receiving an indication from the server that an encryption context between Common Encryption and Datagram Transport Layer Security (DTLS) for the Secure Realtime Protocol (SRTP) (DTLS-SRTP) may be reused in the WebRTC session, fetching a key for the DASH content from an encryption server in response to receiving the indication from the server that the encryption context between Common Encryption and DTLS-SRTP may be reused in the WebRTC session, and decrypting SRTP packet payloads of DASH content received in the WebRTC session using the fetched key.

Further aspects include a wireless device having a processor configured with processor-executable instructions to perform operations of any of the methods summarized above. Further aspects include a wireless device having means for performing functions of any of the methods summarized above. Further aspects include a non-transitory processor-readable medium having stored thereon processor-executable instructions configured to cause a processor of a wireless device to perform operations of any of the methods summarized above.

Some aspects include a method performed by a processor of a server for delivering Dynamic Adaptive Streaming Over Hypertext Transfer Protocol (DASH) content through Web Real-Time Communication (WebRTC), including sending a reply to a request from an endpoint computing device for a manifest file for DASH content, in which the reply may include the manifest file for the DASH content and an indication that WebRTC is available for use in delivering the DASH content. In some aspects, the indication that WebRTC is available for use in delivering the DASH content may include an indication that the server is WebRTC capable and an indication of a signaling endpoint to use in a WebRTC session. In some aspects, the indication that WebRTC is available for use in delivering the DASH content further may include an indication of a signaling protocol to use for establishing the WebRTC session.

Some aspects may further include receiving an offer to establish a WebRTC session from the endpoint computing device including an indication of one or more DASH content components for the DASH content, establishing the WebRTC session including a respective media stream for each of the indicated one or more DASH components for the DASH content, generating an object indicating a mapping between each respective media stream of the WebRTC session and that respective media stream's assigned DASH component for the DASH content, and sending an acceptance message establishing the WebRTC session to the endpoint computing device, in which the acceptance message may include the object indicating the mapping. Some aspects may further include delivering the DASH content to the endpoint computing device using at least one respective media stream of the WebRTC session. In some aspects, the offer to establish the WebRTC session from the endpoint computing device further may include an indication of one or more streaming attributes. In some aspects, the one or more streaming attributes are one or more of a bandwidth, a width, a height, a frame rate, a codec, and a file type.

In some aspects, the one or more DASH content components for the DASH content are one or more AdaptationSets for the DASH content. In some aspects, the manifest file for DASH content may be a Media Presentation Description.

Some aspects may further include determining whether an encryption context between Common Encryption and Datagram Transport Layer Security (DTLS) for the Secure Realtime Protocol (SRTP) (DTLS-SRTP) may be reused in the WebRTC session, and in response to determining that the encryption context between Common Encryption and DTLS-SRTP may be reused in the WebRTC session: sending an indication to the endpoint computing device that the encryption context between Common Encryption and DTLS-SRTP may be reused in the WebRTC session, and delivering the DASH content to the endpoint computing device without applying further encryption.

Further aspects include a server having a processor configured to perform one or more operations of any of the methods summarized above. Further aspects include a non-transitory processor-readable storage medium having stored thereon processor-executable instructions configured to cause a processor of a network server to perform operations of any of the methods summarized above. Further aspects include a server having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
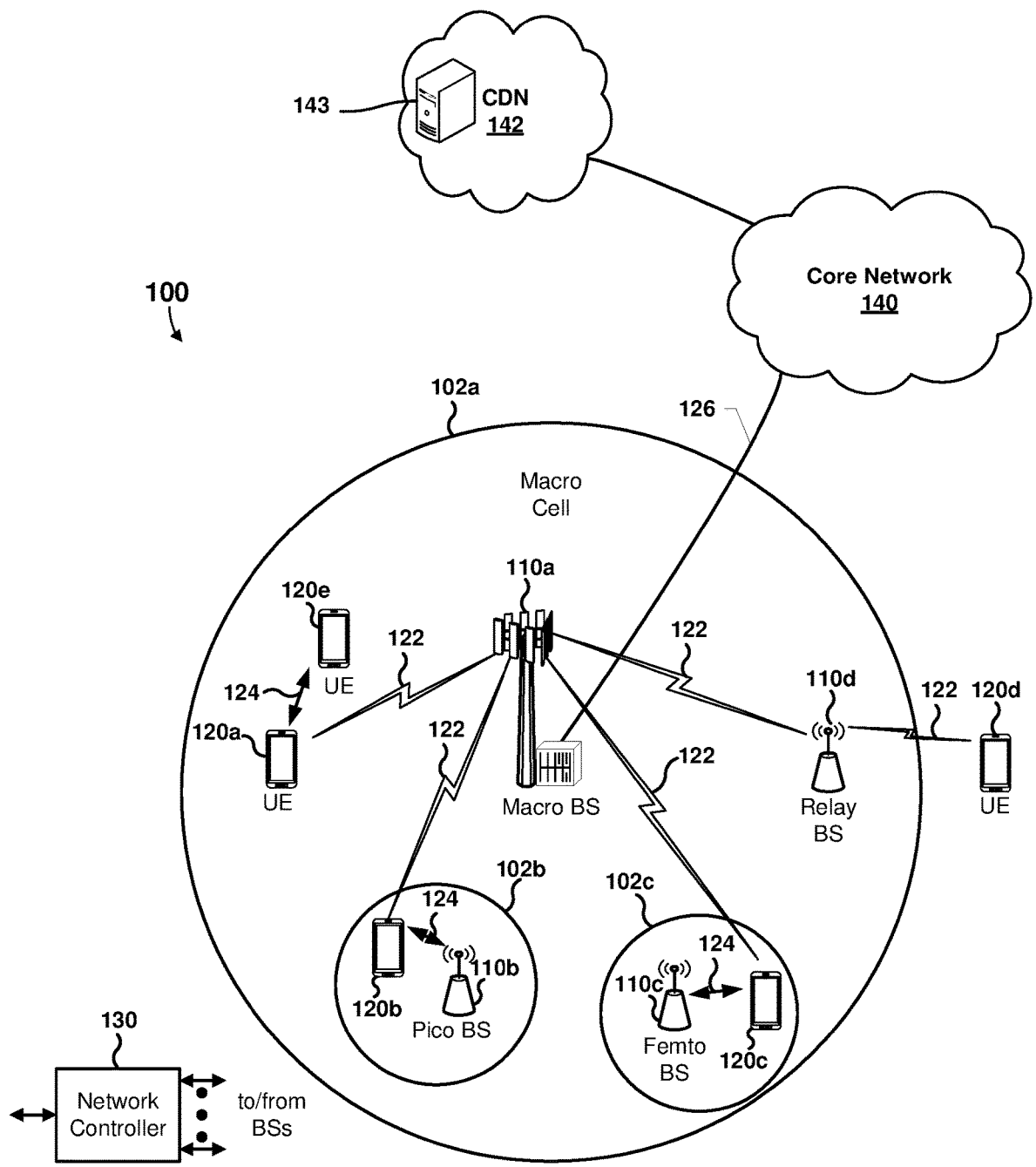
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for delivering Dynamic Adaptive Streaming Over Hypertext Transfer Protocol (DASH) content through Web Real-Time Communication (WebRTC). Various aspects may enable the mapping of DASH content onto WebRTC transport sessions. DASH may support large scale content distribution, such as content distributed by a content delivery network (CDN), and WebRTC may support media streaming at close to real-time latency. Mapping of DASH content onto WebRTC transport sessions in accordance with various embodiments may reduce, such as minimize, end-to-end latency in distributing DASH content, such as live and real-time content. Various embodiments may further enable the reuse of encryption contexts, thereby reducing processing overhead in delivering DASH content.

The terms "wireless device", "user equipment", and "UE" are used herein to refer to any one or all of endpoint or user devices, including wireless devices, wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, UEs affixed to or incorporated into various mobile platforms, global positioning system devices, and similar electronic devices that include a memory, wireless communication components and a programmable processor.

The term "radio resource" is used herein to refer to hardware, such as modems, radios, processors, transceivers, transmitters, receivers, timers, voltage regulators, oscillators, amplifiers, filters, antennas, circuits, encoders, decoders, etc., and/or software that operate individually, or in any combination, for sending and/or receiving electromagnetic radiation to provide wireless communication services, such as cellular and mobile communication services.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet switched (PS) services. Data services in LTE may be provided over the Internet, while multimedia services may be supported by the Internet Multimedia Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN).

One implementation option for advanced networks, such as 5G new radio (NR)(5GNR) networks, future generation system networks (e.g., sixth generation (6G) or higher networks), etc., being adopted is a 5G SA network in which a 5G radio access network (RAN) and 5G core network provide 5G services in geographic area, such as a country. As such, 5G SA networks can overlap coverage in the geographic area, such as the country, with LTE networks. 5G SA networks can exclusively include NR base stations, such as Next Generation NodeB (gNodeBs or gNBs).

Another implementation option for advanced systems or networks (e.g., 5G systems or networks, 6G systems or networks, higher generation systems or networks, etc.) currently being adopted is a 5G NSA network in which a RAN providing both LTE (also referred to as 4G) and new radio (NR) (also referred to a 5G) support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A wireless device, sometimes referred to as a user equipment (UE), in such 5G NSA networks that can support both LTE and NR communications can signal to the 5G NSA that the UE supports dual connectivity with new radio (DCNR).

Web Real-Time Communication (WebRTC) is a protocol that supports devices conducting real-time point-to-point communication. WebRTC leverages the Real-Time Transport Protocol (RTP) for the transmission of media, WebRTC enables the establishment of a WebRTC session between computing devices, such as between an endpoint wireless device and a server (e.g., a server of a CDN network, gaming server, conferencing server, etc.), in which multiple streams may be supported for data transmission between the devices in the WebRTC sessions, such as multiple RTP streams multiplexed through a single IP address and port. In WebRTC, the session setup protocol may be undefined, though several implementations rely on session initiation protocol (SIP) session setup and session description protocol (SDP) signaling to establish WebRTC sessions between devices.

Hypertext Transfer Protocol (HTTP) streaming is a popular method of delivering content over the Internet. Content is made available progressively through segments. The segment availability follows a timeline that indicates when each successive segment becomes available at the HTTP server. The content may be streamed according to streaming formats, such as Dynamic Adaptive Streaming Over Hypertext Transfer Protocol (DASH) or HTTP Live Streaming (HLS). Streaming formats typically consider two types of main formats, the manifest providing instructions on where and when to access the segments, and the segment formats that contain the actual media content in a downloadable and timed fashion. Where in the following the focus is on DASH and the term Media Presentation Description (MPD) is used for the manifest, the same concepts may apply to other streaming formats that consist of a manifest and segment formats. As one example, another manifest format may include the Common Media Application Format (CMAF).

DASH is a standard that implements HTTP streaming. DASH announces the segment availability in a manifest file referred to as a Media Presentation Description (MPD). The MPD is a segment availability timeline that announces the segments' location (typically a (Uniform Resource Locator (URL) to an HTTP server), the times segments are available, and possibly the size of the segments. A DASH client running on a processor of a computing device, such as a DASH client providing content to an adaptive bitrate (ABR) player, uses the MPD to request and receive segments of a service from a server, such as segments of a media streaming service provided by a CDN server. The segments of a service described by a MPD may be referred to as a Presentation, and, as such, the term Presentation may generally refer to the DASH content to be served, and/or actually served, to an endpoint computing device.

While WebRTC may support point-to-point communication, WebRTC does not currently support large scale content distribution, such as large scale distribution of DASH content delivery to endpoint computing devices in various type content delivery services, such as sport betting services, broadcast services, cloud based game streaming services, on-line gaming spectator mode services, in-stadium interactive services, etc. In particular, WebRTC does not currently define how to setup and offer rate adaptation based on adaptive bitrate encodings of a DASH session over WebRTC.

Various embodiments may include systems and methods for delivering DASH content through WebRTC. Various embodiments may enable the mapping of DASH content onto WebRTC transport sessions. In various embodiments, DASH content may be mapped onto WebRTC transport sessions to support large scale content distribution, such as large scale distribution of DASH content delivery to endpoint computing devices in various type content delivery services, such as sport betting services, broadcast services, cloud based game streaming services, on-line gaming spectator mode services, in-stadium interactive services, etc. In various embodiments, signaling from a server providing content to an endpoint computing device offer and setup a DASH session over WebRTC, for example a DASH session including rate adaptation based on adaptive bitrate encodings may be offered and setup using a WebRTC session between a server providing DASH content and an endpoint computing device (e.g., a wireless device) over WebRTC.

In various embodiments, a server providing DASH content, such as a CDN edge node server, may signal to an endpoint computing device that the server is able to serve DASH content using WebRTC. In various embodiments, a server providing DASH content, such as a CDN edge node server, may receive a request from an endpoint computing device for a manifest for the DASH content (e.g., a request for an MPD). The server providing DASH content, such as a CDN edge node server, may fetch the requested manifest file (e.g., the requested MPD). The requested manifest file (e.g., the requested MPD) may be fetched from a memory available to the server or downloaded from another computing device, such as a source server providing DASH content to a CDN.

In various embodiments, a server providing DASH content, such as a CDN edge node server, that is able to serve DASH content described by the requested manifest (e.g., is able to serve DASH content of a Presentation described by a requested MPD) may signal to the requesting endpoint computing device that WebRTC is available for use in delivering the DASH content. The signal to the requesting endpoint computing device that WebRTC is available for use in delivering the DASH content may include an indication that the server is WebRTC capable and an indication of a signaling endpoint (e.g., an IP address and port) to use in a WebRTC session. As an example, a server may respond to a request for a manifest file with a response including the requested manifest file, an indication the server is WebRTC capable and an indication of the signaling endpoint (e.g., an IP address and port). The signal to the requesting endpoint computing device that WebRTC is available for use in delivering the DASH content may include an indication that the server is WebRTC capable, an indication of a signaling endpoint (e.g., an IP address and port) to use in a WebRTC session, and an indication of a signaling protocol to use for establishing a WebRTC session (e.g., SDP or other suitable protocol).

As an example, a server may respond to a request for a manifest file with a response including the requested manifest file, an indication the server is WebRTC capable, an indication of the signaling endpoint (e.g., an IP address and port), and an indication of a signaling protocol to use for establishing a WebRTC session (e.g., SDP or other suitable protocol). As an example, a server providing DASH content, such as a CDN edge node server, may respond to an HTTP GET message for a MPD from a requesting endpoint computing device with an HTTP 200/OK response message including the requested MPD, an indication the server is WebRTC capable (e.g., an element in the HTTP response indicating "WebRTC available"), an indication of the signaling endpoint (e.g., an element in the HTTP response listing the IP address and port for using in a WebRTC session), and an indication of the signaling protocol to use for establishing a WebRTC session (e.g., an element in the HTTP response indicating "SDP").

In various embodiments, an endpoint computing device receiving a signal from a server providing DASH content, such as a CDN edge node server, that WebRTC is available for use in delivering the DASH content may determine to switch to or use WebRTC for receiving the DASH content. In various embodiments, an endpoint computing device selecting WebRTC for receiving DASH content may parse the manifest file received (e.g., parse a received MPD) to determine DASH content components of a service to be consumed. For example, an endpoint computing device selecting WebRTC for receiving DASH content may parse a received MPD to determine content components of a service to consume and the corresponding Periods and AdaptationSets for those content components.

In various embodiments, an endpoint computing device selecting WebRTC for receiving DASH content may determine streaming attributes associated with the DASH content components of a service to be consumed. For example, the streaming attributes may include one or more operation points the endpoint computing device may support a content component, such as bandwidth (e.g., maximum bandwidth), width/height (e.g., maximum width and/or height), frame rate (e.g., maximum frame rate), etc. For example, the streaming attributes may include codecs and/or file types to use for a content component. As an example, an endpoint computing device selecting WebRTC for receiving DASH content may determine streaming attributes associated with the DASH content components of a service to be consumed per selected AdaptationSet based on the maximum attributes (e.g., @max attributes) indicated in the MPD for each respective selected AdaptationSet. Additionally, the endpoint computing device may assess its own capabilities to determine maximum operation points the endpoint computing device can support for each respective selected AdaptationSet (e.g., maximum bandwidth, maximum width, maximum height, maximum frame rate, etc.), as well as the codecs (e.g., @codecs) and file types (e.g., @mimeTypes) of each selected AdaptationSet.

In various embodiments, an endpoint computing device selecting WebRTC for receiving DASH content may send an offer to establish a WebRTC session to a signaling endpoint (e.g., an IP address and port), such as the signaling endpoint indicated by the server providing DASH content when providing a manifest file (e.g., an MPD) for the DASH content. The offer to establish a WebRTC session may be sent using the signaling protocol (e.g., SDP) indicated by the server for use in establishing a WebRTC session. In various embodiments, the offer to establish a WebRTC session may include indications of the DASH content components of a service to be consumed selected by the endpoint computing device and the streaming attributes associated with the DASH content components determined by the endpoint computing device. For example, the offer to establish a WebRTC session may include one media line per content component with maximum capabilities corresponding to the streaming attributes determined by the endpoint computing device. For example, the offer to establish a WebRTC session may include one media line per selected AdaptationSet along with the determined maximum operation points the endpoint computing device can support for each respective selected AdaptationSet (e.g., maximum bandwidth, maximum width, maximum height, maximum frame rate, etc.), the codecs (e.g., @codecs), and file types (e.g., @mimeTypes) of each selected AdaptationSet.

In various embodiments, the media streams for the selected DASH content components may be indicated as receive only media streams in the offer to establish a WebRTC session. For example, each media stream in the offer to establish a WebRTC session may be indicated as "recvonly".

In various embodiments, a server providing DASH content, such as a CDN edge node server, that is able to serve DASH content described by the requested manifest (e.g., is able to serve DASH content of a Presentation described by a requested MPD) using WebRTC may receive an offer to establish a WebRTC session at a signaling endpoint (e.g., an IP address and port) from an endpoint computing device selecting WebRTC for receiving DASH content. In various embodiments, based at least in part on the offer to establish a WebRTC session, the server providing DASH content, such as a CDN edge node server, may convert segments of the DASH content to RTP streams of RTP packets and send the RTP streams to the endpoint computing device. In various embodiments, a server providing DASH content, such as a CDN edge node server, may fetch DASH content (e.g., DASH segments) from a cache and/or DASH content source, convert the DASH content (e.g., DASH segments) to RTP packets, and send the RTP packets to the endpoint computing device. In various embodiments, an RTP stream may be assigned for each content component (e.g., each AdaptationSet) indicated in a received offer to establish a WebRTC session from an endpoint computing device. In various embodiments, additionally a CMAF track and segment format may be mapped to one RTP stream, such as an RTP hint track. In various embodiments, a manifest file, such as an MPD, may be used to establish Real-Time Transport Control Protocol (RTCP) synchronization between media streams of different content versions, such as synchronization between media streams of different DASH Representations. In various embodiments, security contexts may be established for the WebRTC session.

In various embodiments, once media streams for the WebRTC session are established by a server providing DASH content, such as a CDN edge node server, that is able to serve DASH content described by the requested manifest (e.g., is able to serve DASH content of a Presentation described by a requested MPD) using WebRTC, the server may establish a mapping between content components of the DASH content selected by an endpoint computing device and the actual media streams of the WebRTC session used to deliver the DASH content. For example, a mapping may be established between selected Presentations of each content component and the actual media streams of the WebRTC session. For example, a label attribute of the SDP may be associated with the @id or Label of a selected Representation to map content components of the DASH content selected by an endpoint computing device and the actual media streams of the WebRTC session used to deliver the DASH content.

In various embodiments, a mapping between content components of the DASH content selected by an endpoint computing device and the actual media streams of the WebRTC session used to deliver the DASH content may be established by generating a mapping object indicating the assignments of the respective content components of the DASH content selected by the endpoint computing device to the actual media streams of the WebRTC session used to deliver the DASH content. As an example, a JavaScript Object Notation (JSON) mapping object may include an indication of an association between a label attribute of the SDP and the @id or Label of a selected Representation to map content components of the DASH content selected by an endpoint computing device and the actual media streams of the WebRTC session used to deliver the DASH content.

Such an example JSON mapping object may be exchanged between the server and the endpoint computing device to establish and/or update a mapping of content components of the DASH content selected by the endpoint computing device and the actual media streams of the WebRTC session used to deliver the DASH content by the server.

The mapping, such as the JSON mapping object, may be sent to the endpoint computing device as part of an initial control message to setup the WebRTC session. For example, the mapping, such as the JSON mapping object, may be sent to the endpoint computing device in an acceptance message confirming the WebRTC session. The acceptance message confirming the WebRTC session may be an answer to the offer to establish the WebRTC session.

Various embodiments may enable the reuse of encryption contexts. In various embodiments, a server providing DASH content, such as a CDN edge node server, that is able to serve DASH content described by the requested manifest (e.g., is able to serve DASH content of a Presentation described by a requested MPD) using WebRTC may determine whether a selected Representation of DASH content is content protected. In response to determining that a selected Representation of DASH content is content protected, a server providing DASH content, such as a CDN edge node server, that is able to serve DASH content described by the requested manifest (e.g., is able to serve DASH content of a Presentation described by a requested MPD) using WebRTC may determine whether an encryption context between Common Encryption and Datagram Transport Layer Security (DTLS) for the Secure Realtime Protocol (SRTP) (DTLS-SRTP) may be reused. For example, an encryption context between Common Encryption and DTLS-SRTP may be reused when a data rights management (DRM) server encrypts DASH content prior to the content being fetched by a server providing DASH content, such as a CDN edge node server, that is able to serve DASH content described by the requested manifest (e.g., is able to serve DASH content of a Presentation described by a requested MPD) using WebRTC.

In response to determining that an encryption context between Common Encryption and DTLS-SRTP may be reused, the context reuse may be signaled to the endpoint computing device and an initialization vector may be reused as a salt for encryption on the WebRTC session. The endpoint computing device may fetch the key from the encrypting server, such as a DRM server and use the key to decrypt the SRTP packet payload. The server providing DASH content, such as a CDN edge node server, that is able to serve DASH content described by the requested manifest (e.g., is able to serve DASH content of a Presentation described by a requested MPD) using WebRTC may send the DASH content in the WebRTC session using the encryption context with Common Encryption and DTLS-SRTP as the DASH content is originally fetched without re-encrypting the DASH content (e.g., using Common Encryption and DTLS-SRTP to perform the re-encryption). As such, packets of the DASH content that are already encrypted, such as encrypted using Common Encryption and DTLS-SRTP, may not be re-encrypted by the server prior to sending to the endpoint computing device.

Various embodiments improve the operations and efficiencies of communication networks and improve the user experience of some applications and services. Mapping of DASH content onto WebRTC transport sessions in accordance with various embodiments may reduce or minimize end-to-end latency in distributing DASH content, such as live and real-time content, to endpoint computing devices (e.g., UEs). Reducing, such as minimizing, end-to-end latency in distributing DASH content in accordance with various embodiments may benefit various services leveraging DASH content delivery to users of endpoint computing devices, such as sport betting services, broadcast services, cloud based game streaming services, on-line gaming spectator mode services, in-stadium interactive services, etc. Various embodiments may further enable the reuse of encryption contexts, which may eliminate an encryption operation by a server, such as an edge server of a CDN, thereby reducing processing overhead in delivering DASH content to endpoint computing devices. Reducing processing overhead in delivering DASH content in accordance with various embodiments may benefit various services leveraging DASH content delivery to end users, such as sport betting services, broadcast services, cloud based game streaming services, on-line gaming spectator mode services, in-stadium interactive services, etc.

FIG. 1A is a system block diagram illustrating an example communications system 100. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1A). The communications system 100 also may include various network devices 143, such as various servers of a content delivery network (CDN) 142, etc. The communications system 100 also may include a number of base stations (illustrated as the BS 110a, the BS 110b, the BS 110c, and the BS 110d) and other network entities. A base station is an entity that communicates with UEs, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with a service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The UEs 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a UE) and send a transmission of the data to a downstream station (for example, a UE or a base station). A relay station also may be a wireless device (e.g., a UE) that can relay transmissions for other UEs. In the example illustrated in FIG. 1A, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout the communications system 100, and each UE may be stationary or mobile. A UE also may be referred to as an access terminal, a terminal, a mobile station, a subscriber unit, a station, wireless device, etc.

A macro base station 110a may communicate with the communication network 140 over a wired or wireless communication link 126. The UEs 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more UEs (for example, illustrated as the UE 120a and the UE 120e) may communicate directly using one or more sidelink channels (for example, without using a base station 110a-d as an intermediary to communicate with one another). For example, the UEs 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the base station 110a-110d.

In some implementations, the CDN 142 may provide content, such as DASH content, to one or more of the UEs 120a-120e. The content, such as DASH content, may be delivered from one or more servers 143 of the CDN 142 to the UEs 120a-120e via the core network 140 and connections 122, 126. The one or more servers 143 of the CDN 142 may be node servers. A server 143 of the CDN 142 originating the content, such as DASH content, and providing it to other servers 143 of the CDN 142 may be referred to as a source server. The content, such as DASH content, may be delivered using various protocols, such as HTTP (e.g., HTTP/1.1, etc.), WebRTC, etc. The server 143 of the CDN 142 providing the content, such as DASH content, to the core network 140 may be referred to as an edge node server of the CDN 142. A UE 120a-120e receiving content, such as DASH content, from the CDN 142 may be an endpoint computing device. As examples, the CDN 142 may support delivery of DASH content to endpoint computing devices (e.g., UE 120a-120e) thereby provisioning various services to the endpoint computing devices, such as live video services, sport betting services, broadcast services, cloud based game streaming services, on-line gaming spectator mode services, in-stadium interactive services, etc.

Figure 1B:
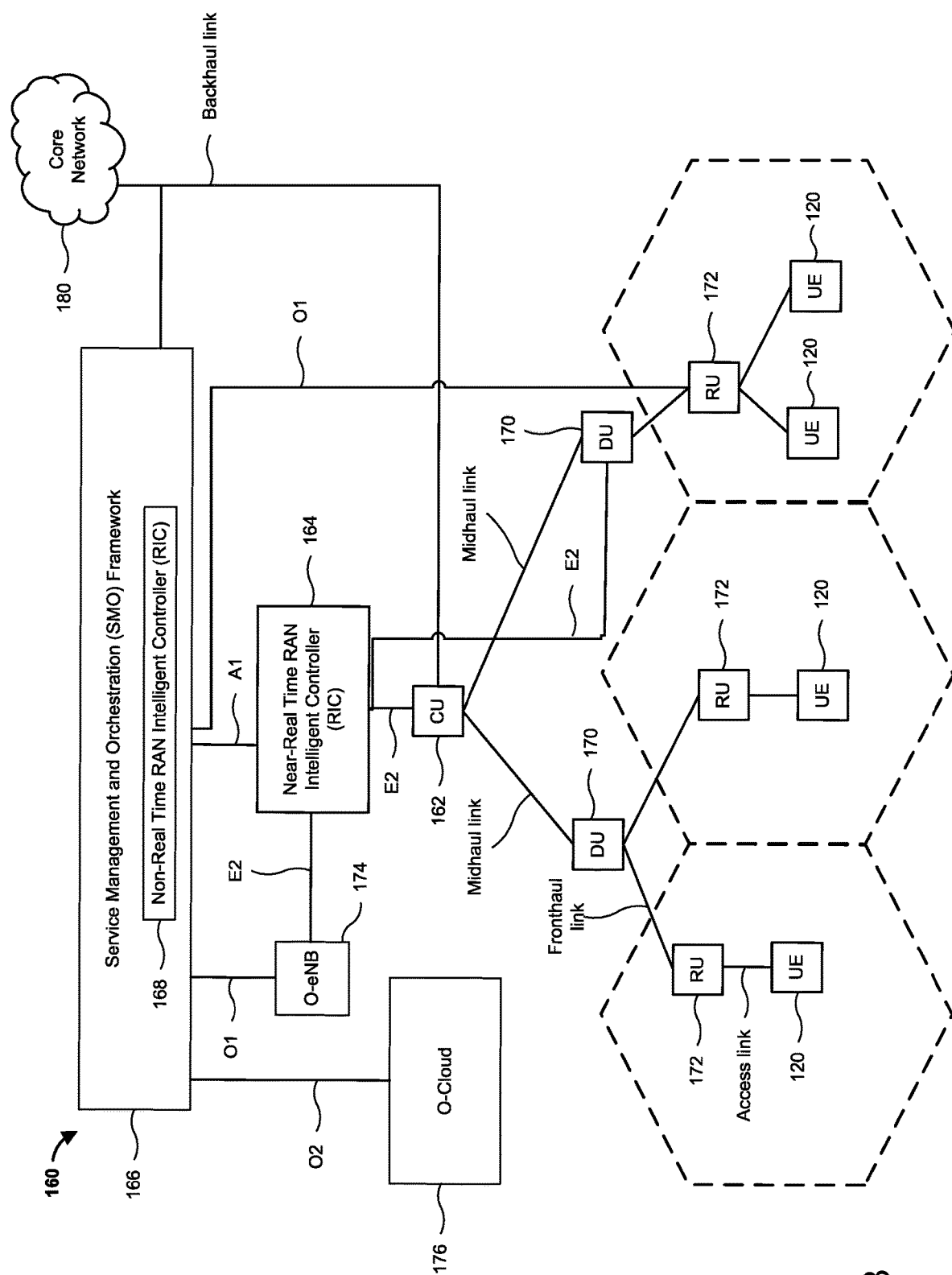
FIG. 1B is a system block diagram illustrating an example disaggregated base station architecture for wireless communication systems suitable for implementing any of the various embodiments.

FIG. 1B is a system block diagram illustrating an example disaggregated base station 160 architecture that may be part of a V2X and/or 5G network suitable for communicating V2X messages and misbehavior condition information. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, UEs may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration.

The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
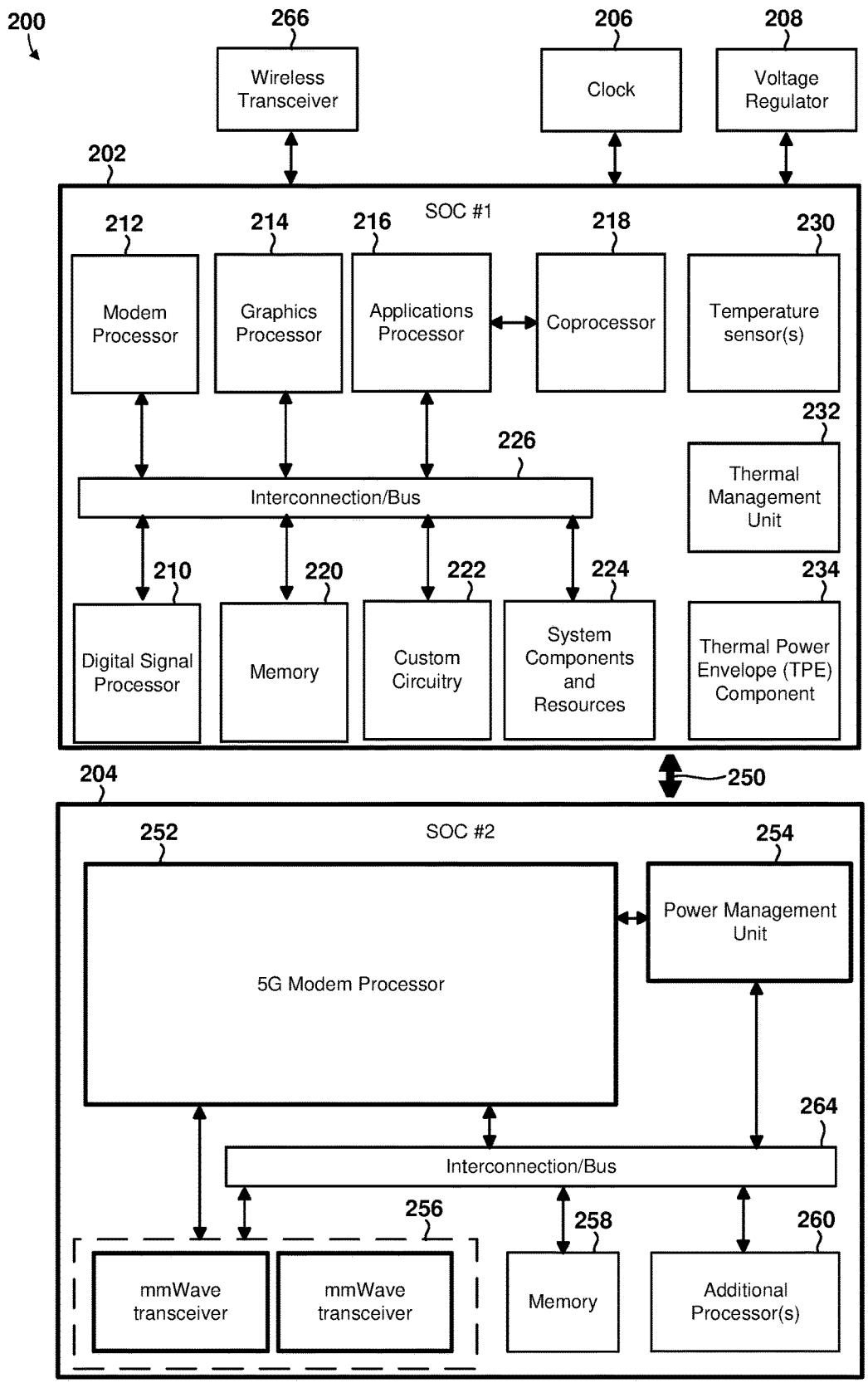
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from UEs, such as a base station 110a. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
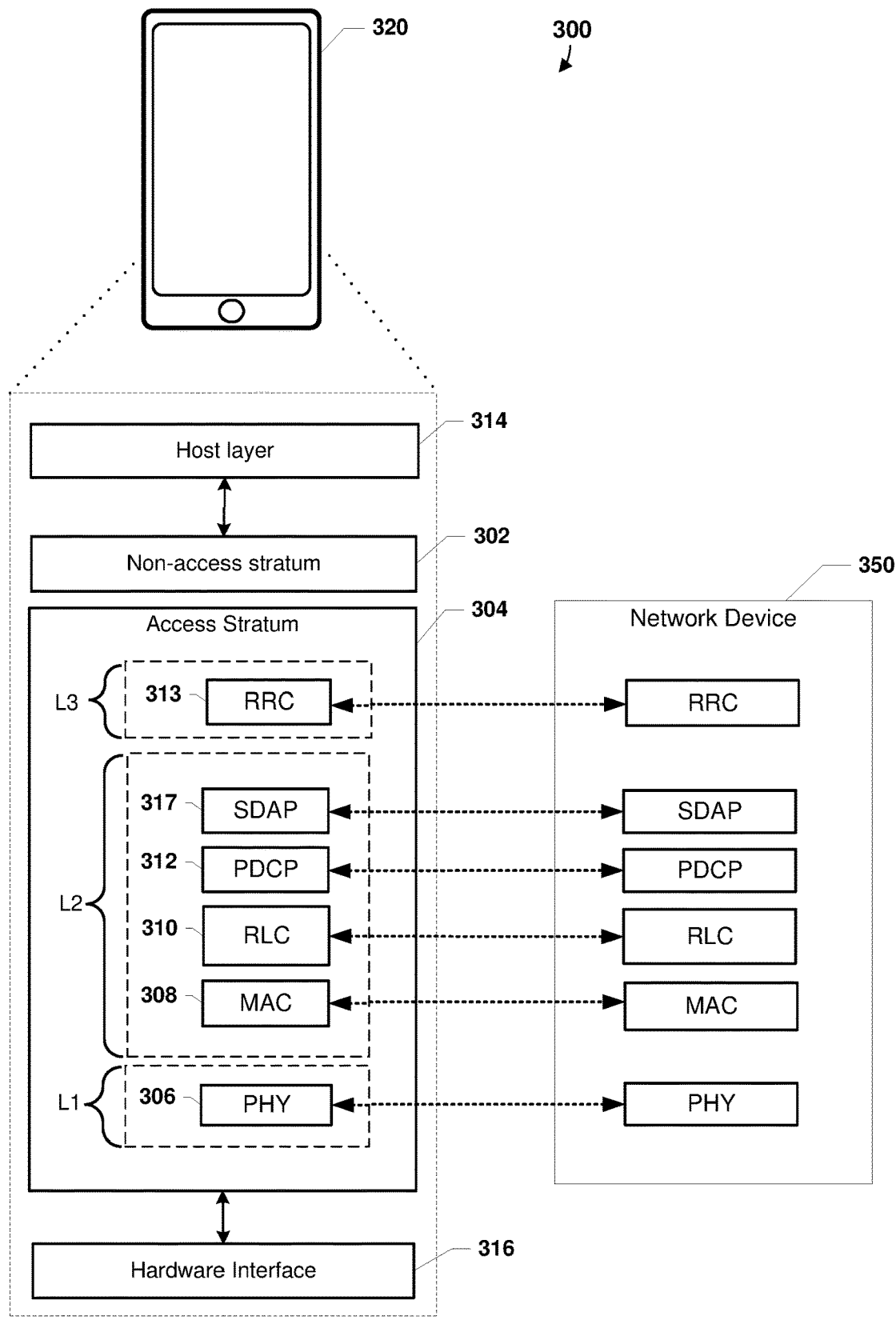
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1A-3, the UE 320 may implement the software architecture 300 to facilitate communication between a UE 320 (e.g., the UE 120a-120e, 200) and a network device 350 (e.g., network device 142a) of a communication system (e.g., 100). In various embodiments, layers in software architecture 300 may form logical connections with corresponding layers in software of the network device 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different subscriber identity module (SIM) (e.g., two protocol stacks associated with two SIMs, respectively, in a dual-SIM wireless communication device). While described below with reference to LTE communication layers, the software architecture 300 may support any of a variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network device 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer each of which form logical connections terminating at the network device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network device 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
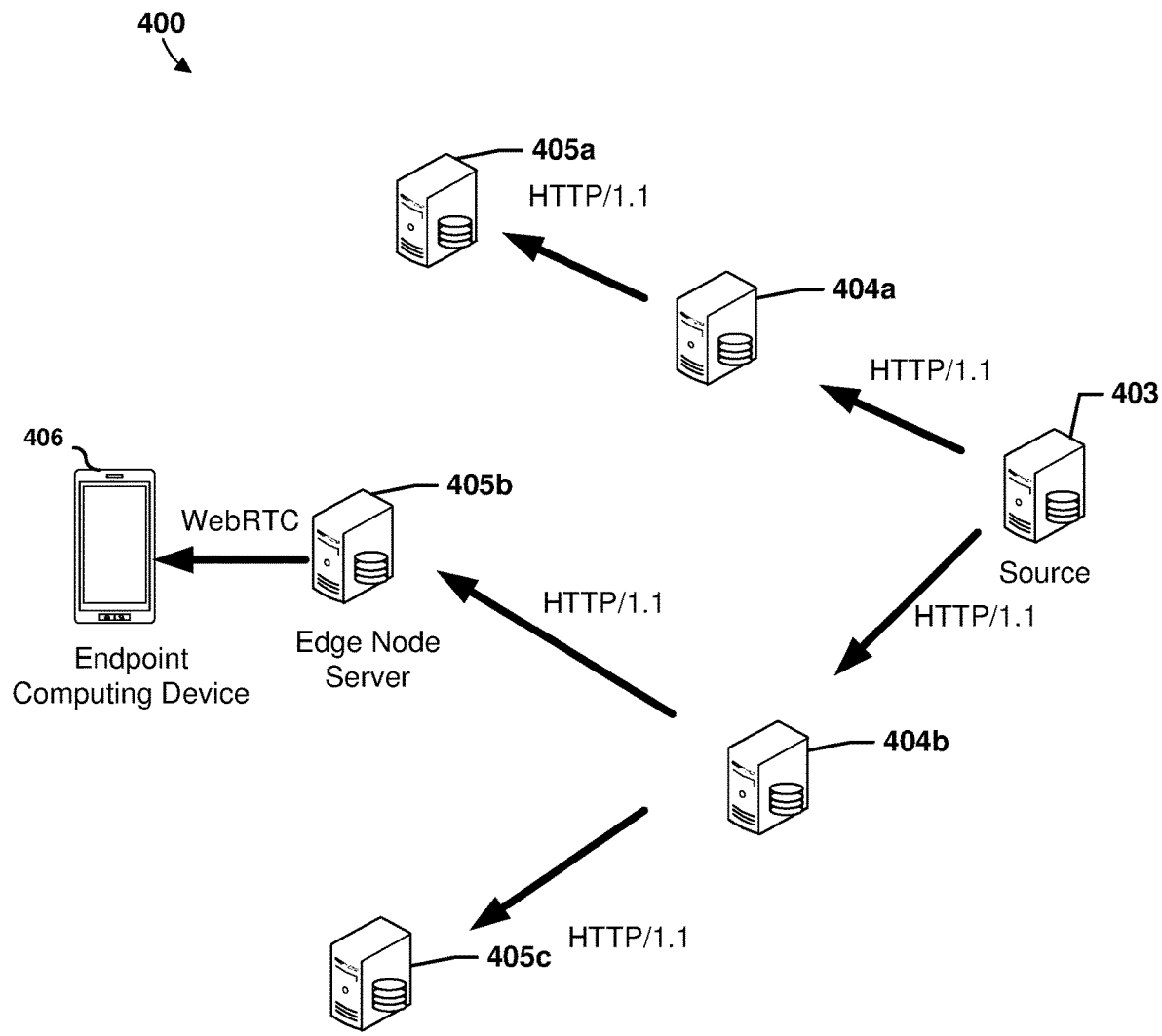
FIG. 4 is a system block diagram of an example Content Delivery Network (CDN) in accordance with various embodiments.

FIG. 4 is a system block diagram of an example CDN 400 (e.g., CDN 142) in accordance with various embodiments. With reference to FIGS. 1A-4, the CDN 400 may delivery DASH content from a source server 403 through node servers 404a-b and 405a-405c (e.g., servers 143). The DASH content may be cached at the various node servers 404a-404b and 405a-405c. The source server 403 may provide DASH content to intermediate node servers 404a-404b via HTTP communications, such as HTTP/1.1 communications. The intermediate node servers 404a-404b may provide DASH content to the edge node servers 405a-405c via HTTP communications, such as HTTP/1.1 communications. The edge node servers 405a-405c may be the servers that provide point-to-point communication of DASH content from the CDN 400 to endpoint computing device 406 (e.g., UE 120a-120e, 200, 300). The endpoint computing device 406 may also be referred to as a client device and may include a media client application, such as a DASH client application, running on a processor that may consumer the DASH content received from the CDN 400. As examples, the CDN 400 may support delivery of DASH content to endpoint computing device 406 thereby provisioning various services to the endpoint computing device 406, such as live video services, sport betting services, broadcast services, cloud based game streaming services, on-line gaming spectator mode services, in-stadium interactive services, etc.

In various embodiments, an edge node server 405b may support delivery of the DASH content to the endpoint computing device 406 using WebRTC. In this manner, rather than delivering the DASH content to the endpoint computing device 406 via HTTP communications, such as HTTP/1.1 communications, the edge node server 405b may deliver the DASH content using WebRTC. In some embodiments, the edge node server 405b may indicate support for WebRTC to the endpoint computing device 406. In some embodiments, the endpoint computing device 406 may trigger an update to WebRTC. In some embodiments, the WebRTC-capable edge node server 405b may convert segments for the DASH content to RTP streams based on the endpoint computing device's selection of WebRTC for DASH content delivery. In some embodiments, additionally a CMAF track and segment format may be mapped to one RTP stream, such as an RTP hint track. In some embodiments, a MPD may be used to establish Real-Time Transport Control Protocol (RTCP) synchronization between media streams of different content versions, such as synchronization between media streams of different DASH Representations. In some embodiments, security contexts may be established for the WebRTC session.

Figure 5:
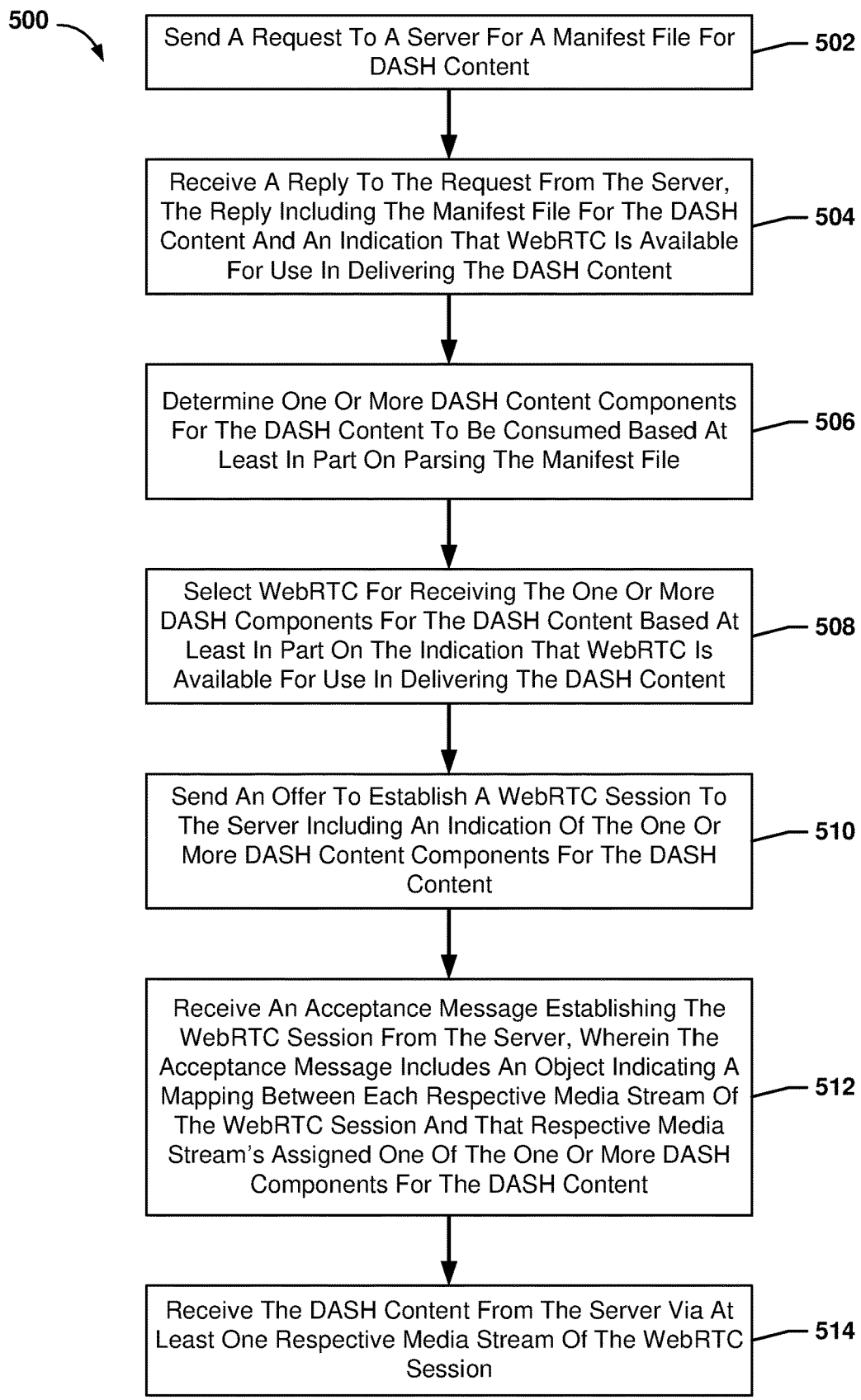
FIG. 5 is a process flow diagram illustrating a method that may be performed by a processor of an endpoint computing device for receiving Dynamic Adaptive Streaming Over Hypertext Transfer Protocol (DASH) content through Web Real-Time Communication (WebRTC) in accordance with various embodiments.

FIG. 5 is a process flow diagram illustrating a method 500 that may be performed by a processor of an endpoint computing device for receiving DASH content through WebRTC in accordance with various embodiments. With reference to FIGS. 1A-5, the method 500 may be implemented by one or more processors (e.g., 210, 212, 214, 216, 218, 252, 260, 426) of an endpoint computing device (e.g., 120a-120e, 200, 300, 406).

In block 502, the processor may perform operations including sending a request to a server for a manifest file for DASH content. As an example, a request for a manifest file for DASH content may be a HTTP GET request for an MPD of DASH content. Means for performing functions of the operations in block 502 may be one or more processors of an endpoint computing device (e.g., 120a-120e, 200, 300, 406), such as one or more of the processors 210, 212, 214, 216, 218, 252, 260, 426, and/or the wireless transceiver 266.

In block 504, the processor may perform operations including receiving a reply to the request from the server, the reply including the manifest file for the DASH content and an indication that WebRTC is available for use in delivering the DASH content. In various embodiments, a server providing DASH content, such as a CDN edge node server, that is able to serve DASH content described by the requested manifest (e.g., is able to serve DASH content of a Presentation described by a requested MPD) may signal to the requesting endpoint computing device that WebRTC is available for use in delivering the DASH content. As an example, a server providing DASH content, such as a CDN edge node server, may respond to an HTTP GET message for a MPD from a requesting endpoint computing device with an HTTP 200/OK response message including the requested MPD and an indication the server is WebRTC capable (e.g., an element in the HTTP response indicating "WebRTC available"). In some embodiments, the reply may include additional indications, such as an indication of a signaling endpoint (e.g., an IP address and port) to use in a WebRTC session and/or an indication of a signaling protocol to use for establishing a WebRTC session (e.g., SDP or other suitable protocol). As an example, a server providing DASH content, such as a CDN edge node server, may respond to an HTTP GET message for a MPD from a requesting endpoint computing device with an HTTP 200/OK response message including the requested MPD, an indication the server is WebRTC capable (e.g., an element in the HTTP response indicating "WebRTC available"), an indication of the signaling endpoint (e.g., an element in the HTTP response listing the IP address and port for using in a WebRTC session), and an indication of the signaling protocol to use for establishing a WebRTC session (e.g., an element in the HTTP response indicating "SDP"). Means for performing functions of the operations in block 504 may be one or more processors of an endpoint computing device (e.g., 120a-120e, 200, 300, 406), such as one or more of the processors 210, 212, 214, 216, 218, 252, 260, 426, and/or the wireless transceiver 266.

In block 506, the processor may perform operations including determining one or more DASH content components for the DASH content to be consumed based at least in part on parsing the manifest file. In various embodiments, an endpoint computing device may parse the manifest file received (e.g., parse a received MPD) to determine DASH content components of a service to be consumed. For example, an endpoint computing device may parse a received MPD to determine content components of a service to consume and the corresponding Periods and AdaptationSets for those content components. Means for performing functions of the operations in block 506 may be one or more processors of an endpoint computing device (e.g., 120a-120e, 200, 300, 406), such as one or more of the processors 210, 212, 214, 216, 218, 252, 260, 426, and/or the like.

In block 508, the processor may perform operations including selecting WebRTC for receiving the one or more DASH content components for the DASH content based at least in part on the indication that WebRTC is available for use in delivering the DASH content. For example, the endpoint computing device may determine to switch to, or use, WebRTC for receiving the DASH content. Means for performing functions of the operations in block 508 may be one or more processors of an endpoint computing device (e.g., 120a-120e, 200, 300, 406), such as one or more of the processors 210, 212, 214, 216, 218, 252, 260, 426, and/or the like.

In block 510, the processor may perform operations including sending an offer to establish a WebRTC session to the server including an indication of the one or more DASH content components for the DASH content. In various embodiments, an endpoint computing device selecting WebRTC for receiving DASH content may send an offer to establish a WebRTC session to a signaling endpoint (e.g., an IP address and port), such as the signaling endpoint indicated by the server providing DASH content when providing a manifest file (e.g., an MPD) for the DASH content. The offer to establish a WebRTC session may be sent using the signaling protocol (e.g., SDP) indicated by the server for use in establishing a WebRTC session. Means for performing functions of the operations in block 510 may be one or more processors of an endpoint computing device (e.g., 120a-120e, 200, 300, 406), such as one or more of the processors 210, 212, 214, 216, 218, 252, 260, 426, and/or the wireless transceiver 266.

In some embodiments, the offer to establish a WebRTC session may additionally include indications of streaming attributes associated with the DASH content components determined by the endpoint computing device. In some embodiments, an endpoint computing device selecting WebRTC for receiving DASH content may determine streaming attributes associated with the DASH content components of a service to be consumed. For example, the streaming attributes may include one or more operation points the endpoint computing device may support a content component, such as bandwidth (e.g., maximum bandwidth), width/height (e.g., maximum width and/or height), frame rate (e.g., maximum frame rate), etc. For example, the streaming attributes may include codecs and/or file types to use for a content component.

As an example, an endpoint computing device selecting WebRTC for receiving DASH content may determine streaming attributes associated with the DASH content components of a service to be consumed per selected AdaptationSet based on the maximum attributes (e.g., @max attributes) indicated in the MPD for each respective selected AdaptationSet and the endpoint computing device's own capabilities to determine maximum operation points the endpoint computing device can support for each respective selected AdaptationSet (e.g., maximum bandwidth, maximum width, maximum height, maximum frame rate, etc.), as well as the codecs (e.g., @codecs) and file types (e.g., @mimeTypes) of each selected AdaptationSet. For example, the offer to establish a WebRTC session may include one media line per content component with maximum capabilities corresponding to the streaming attributes determined by the endpoint computing device. For example, the offer to establish a WebRTC session may include one media line per selected AdaptationSet along with the determined maximum operation points the endpoint computing device can support for each respective selected AdaptationSet (e.g., maximum bandwidth, maximum width, maximum height, maximum frame rate, etc.), the codecs (e.g., @codecs), and file types (e.g., @mimeTypes) of each selected AdaptationSet.

In some embodiments, the media streams for the selected DASH content components may be indicated as receive only media streams in the offer to establish a WebRTC session. For example, each media stream in the offer to establish a WebRTC session may be indicated as "recvonly".

In block 512, the processor may perform operations including receiving an acceptance message establishing the WebRTC session from the server, wherein the acceptance message includes an object indicating a mapping between each respective media stream of the WebRTC session and that respective media stream's assigned one of the one or more DASH components for the DASH content. In various embodiments, once media streams for the WebRTC session are established by a server, the server may establish a mapping between content components of the DASH content selected by an endpoint computing device and the actual media streams of the WebRTC session used to deliver the DASH content. For example, a mapping may be established between selected Presentations of each content component and the actual media streams of the WebRTC session. For example, a label attribute of the SDP may be associated with the @id or Label of a selected Representation to map content components of the DASH content selected by an endpoint computing device and the actual media streams of the WebRTC session used to deliver the DASH content. As an example, a JavaScript Object Notation (JSON) mapping object may include an indication of an association between a label attribute of the SDP and the @id or Label of a selected Representation to map content components of the DASH content selected by an endpoint computing device and the actual media streams of the WebRTC session used to deliver the DASH content. Such an example JSON mapping object may be exchanged between the server and the endpoint computing device to establish and/or update a mapping of content components of the DASH content selected by the endpoint computing device and the actual media streams of the WebRTC session used to deliver the DASH content by the server. The mapping, such as the JSON mapping object, may be sent to the endpoint computing device as part of an initial control message to setup the WebRTC session. For example, the mapping, such as the JSON mapping object, may be sent to the endpoint computing device in an acceptance message confirming the WebRTC session. The acceptance message confirming the WebRTC session may be an answer to the offer to establish the WebRTC session. Means for performing functions of the operations in block 512 may be one or more processors of an endpoint computing device (e.g., 120a-120e, 200, 300, 406), such as one or more of the processors 210, 212, 214, 216, 218, 252, 260, 426, and/or the wireless transceiver 266.

In block 514, the processor may perform operations including receiving the DASH content from the server via at least one respective media stream of the WebRTC session. In various embodiments, a server providing DASH content may fetch DASH content (e.g., DASH segments) from a cache and/or DASH content source, convert the DASH content (e.g., DASH segments) to RTP packets, and send the RTP packets to the endpoint computing device. In some embodiments, an RTP stream may be assigned for each content component (e.g., each AdaptationSet) indicated in a received offer to establish a WebRTC session from an endpoint computing device. In some embodiments, additionally a CMAF track and segment format may be mapped to one RTP stream, such as an RTP hint track. In some embodiments, a manifest file, such as an MPD, may be used to establish Real-Time Transport Control Protocol (RTCP) synchronization between media streams of different content versions, such as synchronization between media streams of different DASH Representations. In some embodiments, security contexts may be established for the WebRTC session. Means for performing functions of the operations in block 514 may be one or more processors of an endpoint computing device (e.g., 120a-120e, 200, 300, 406), such as one or more of the processors 210, 212, 214, 216, 218, 252, 260, 426, and/or the wireless transceiver 266.

Figure 6:
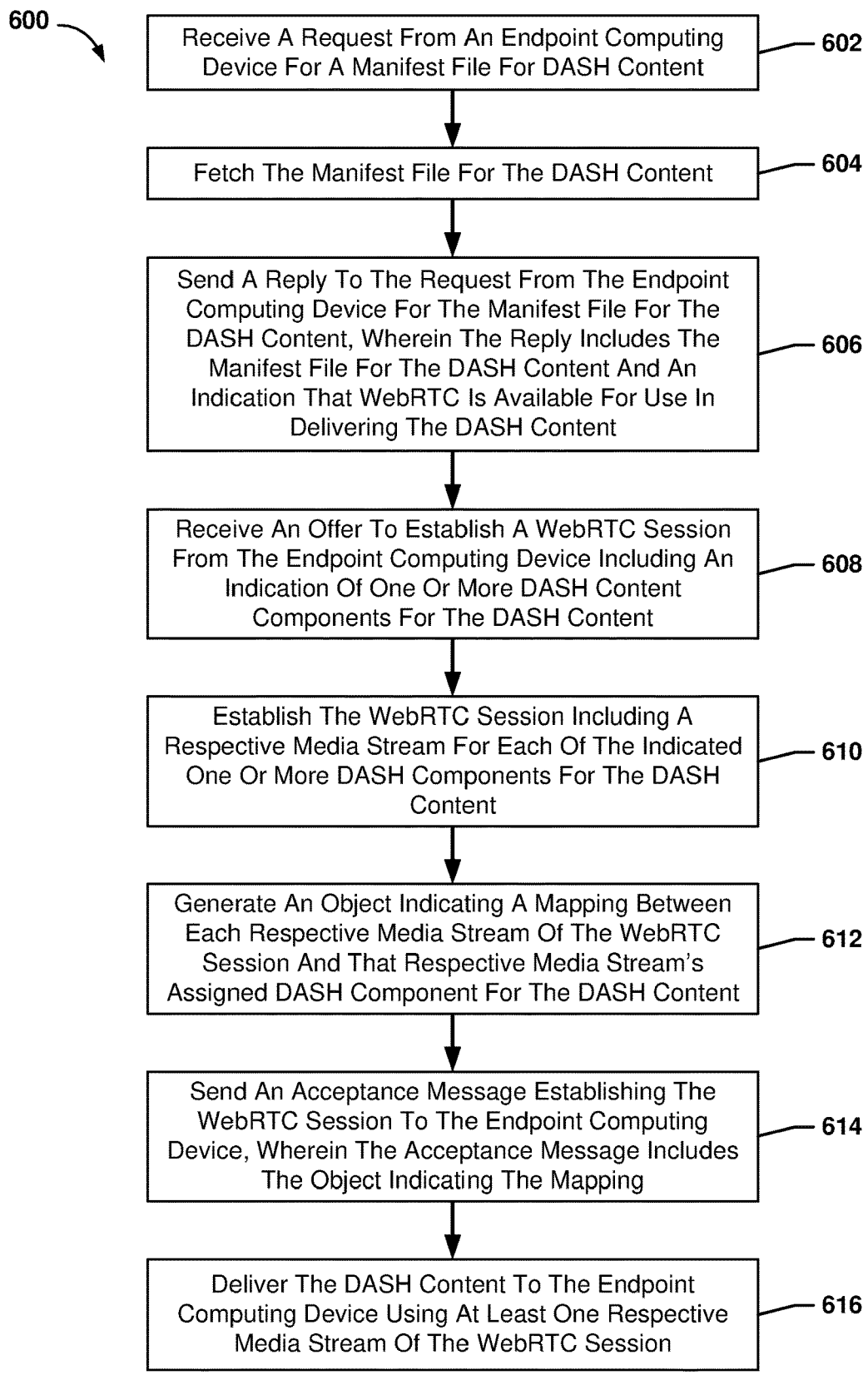
FIG. 6 is a process flow diagram illustrating a method that may be performed by a processor of a server for delivering DASH content through WebRTC in accordance with various embodiments.

FIG. 6 is a process flow diagram illustrating a method 600 that may be performed by a processor of a server for delivering DASH content through WebRTC in accordance with various embodiments. With reference to FIGS. 1A-6, the method 600 may be implemented by one or more processors of a server (e.g., 143, 405b, etc.). In various embodiments, the operations of method 600 may be performed in conjunction with the operations of method 500.

In block 602, the processor may perform operations including receiving a request from an endpoint computing device (e.g., 120a-120e, 200, 300, 406) for a manifest file for DASH content. As an example, a request for a manifest file for DASH content may be a HTTP GET request for an MPD of DASH content. Means for performing functions of the operations in block 602 may be one or more processors of a server (e.g., 143, 405b, etc.).

In block 604, the processor may perform operations including fetching the manifest file or the DASH content. The requested manifest file (e.g., the requested MPD) may be fetched from a memory available to the server or downloaded from another computing device, such as a source server providing DASH content to a CDN. Means for performing functions of the operations in block 604 may be one or more processors of a server (e.g., 143, 405b, etc.).

In block 606, the processor may perform operations including sending a reply to the request from the endpoint computing device for a manifest file for DASH content, wherein the reply includes the manifest file for the DASH content and an indication that WebRTC is available for use in delivering the DASH content. Means for performing functions of the operations in block 606 may be one or more processors of a server (e.g., 143, 405b, etc.).

As an example of operations in block 606, a server providing DASH content, such as a CDN edge node server, may respond to an HTTP GET message for a MPD from a requesting endpoint computing device with an HTTP 200/OK response message including the requested MPD and an indication the server is WebRTC capable (e.g., an element in the HTTP response indicating "WebRTC available"). As another example, a server may respond to a request for a manifest file with a response including the requested manifest file, an indication the server is WebRTC capable and an indication of the signaling endpoint (e.g., an IP address and port).

In some embodiments, the signal sent by the server to the requesting endpoint computing device that WebRTC is available for use in delivering the DASH content in block 606 may include an indication that the server is WebRTC capable, an indication of a signaling endpoint (e.g., an IP address and port) to use in a WebRTC session, and an indication of a signaling protocol to use for establishing a WebRTC session (e.g., SDP or other suitable protocol). As an example, a server providing DASH content, such as a CDN edge node server, may respond to an HTTP GET message for a MPD from a requesting endpoint computing device with an HTTP 200/OK response message including the requested MPD, an indication the server is WebRTC capable (e.g., an element in the HTTP response indicating "WebRTC available"), an indication of the signaling endpoint (e.g., an element in the HTTP response listing the IP address and port for using in a WebRTC session), and an indication of the signaling protocol to use for establishing a WebRTC session (e.g., an element in the HTTP response indicating "SDP").

In block 608, the processor may perform operations including receiving an offer to establish a WebRTC session from the endpoint computing device including an indication of one or more DASH content components for the DASH content. In some embodiments, an endpoint computing device selecting WebRTC for receiving DASH content may send an offer to establish a WebRTC session to a signaling endpoint (e.g., an IP address and port). The offer to establish a WebRTC session may be sent using the signaling protocol (e.g., SDP) indicated by the server for use in establishing a WebRTC session. In some embodiments, the offer to establish a WebRTC session may include indications of the DASH content components of a service to be consumed selected by the endpoint computing device and the streaming attributes associated with the DASH content components determined by the endpoint computing device. For example, the offer to establish a WebRTC session may include one media line per content component with maximum capabilities corresponding to the streaming attributes determined by the endpoint computing device. For example, the offer to establish a WebRTC session may include one media line per selected AdaptationSet along with the determined maximum operation points the endpoint computing device can support for each respective selected AdaptationSet (e.g., maximum bandwidth, maximum width, maximum height, maximum frame rate, etc.), the codecs (e.g., @codecs), and file types (e.g., @mimeTypes) of each selected AdaptationSet. In some embodiments, the media streams for the selected DASH content components may be indicated as receive only media streams in the offer to establish a WebRTC session. For example, each media stream in the offer to establish a WebRTC session may be indicated as "recvonly". Means for performing functions of the operations in block 608 may be one or more processors of a server (e.g., 143, 405b, etc.).

In block 610, the processor may perform operations including establishing the WebRTC session including a respective media stream for each of the indicated one or more DASH components for the DASH content. In various embodiments, establishing the WebRTC session may include assigning a media stream to each DASH component for the DASH content indicated as selected by the endpoint computing device. Means for performing functions of the operations in block 610 may be one or more processors of a server (e.g., 143, 405b, etc.).

In block 612, the processor may perform operations including generating an object indicating a mapping between each respective media stream of the WebRTC session and that respective media stream's assigned DASH component for the DASH content. In various embodiments, once media streams for the WebRTC session are established, the server may establish a mapping between content components of the DASH content selected by an endpoint computing device and the actual media streams of the WebRTC session used to deliver the DASH content. For example, a mapping may be established between selected Presentations of each content component and the actual media streams of the WebRTC session. For example, a label attribute of the SDP may be associated with the @id or Label of a selected Representation to map content components of the DASH content selected by an endpoint computing device and the actual media streams of the WebRTC session used to deliver the DASH content. Means for performing functions of the operations in block 612 may be one or more processors of a server (e.g., 143, 405b, etc.).

In some embodiments, the mapping between content components of the DASH content selected by an endpoint computing device and the actual media streams of the WebRTC session used to deliver the DASH content may be established in block 612 by generating a mapping object indicating the assignments of the respective content components of the DASH content selected by the endpoint computing device to the actual media streams of the WebRTC session used to deliver the DASH content. As an example, a JavaScript Object Notation (JSON) mapping object may include an indication of an association between a label attribute of the SDP and the @id or Label of a selected Representation to map content components of the DASH content selected by an endpoint computing device and the actual media streams of the WebRTC session used to deliver the DASH content. Such an example JSON mapping object may be exchanged between the server and the endpoint computing device to establish and/or update a mapping of content components of the DASH content selected by the endpoint computing device and the actual media streams of the WebRTC session used to deliver the DASH content by the server.

In block 614, the processor may perform operations including sending an acceptance message establishing the WebRTC session to the endpoint computing device, wherein the acceptance message includes the object indicating the mapping. The mapping, such as the JSON mapping object, may be sent to the endpoint computing device as part of an initial control message to setup the WebRTC session. For example, the mapping, such as the JSON mapping object, may be sent to the endpoint computing device in an acceptance message confirming the WebRTC session. The acceptance message confirming the WebRTC session may be an answer to the offer to establish the WebRTC session. Means for performing functions of the operations in block 614 may be one or more processors of a server (e.g., 143, 405b, etc.).

In block 616, the processor may perform operations including delivering the DASH content to the endpoint computing device using at least one respective media stream of the WebRTC session. In various embodiments, the server may convert segments of the DASH content to RTP streams of RTP packets and send the RTP streams to the endpoint computing device. In some embodiments, the server may fetch DASH content (e.g., DASH segments) from a cache and/or DASH content source, convert the DASH content (e.g., DASH segments) to RTP packets, and send the RTP packets to the endpoint computing device. In some embodiments, an RTP stream may be assigned for each content component (e.g., each AdaptationSet) indicated in a received offer to establish a WebRTC session from an endpoint computing device. In some embodiments, additionally a CMAF track and segment format may be mapped to one RTP stream, such as an RTP hint track. In various embodiments, a manifest file, such as an MPD, may be used to establish Real-Time Transport Control Protocol (RTCP) synchronization between media streams of different content versions, such as synchronization between media streams of different DASH Representations. In various embodiments, security contexts may be established for the WebRTC session. Means for performing functions of the operations in block 616 may be one or more processors of a server (e.g., 143, 405b, etc.).

Figure 7:
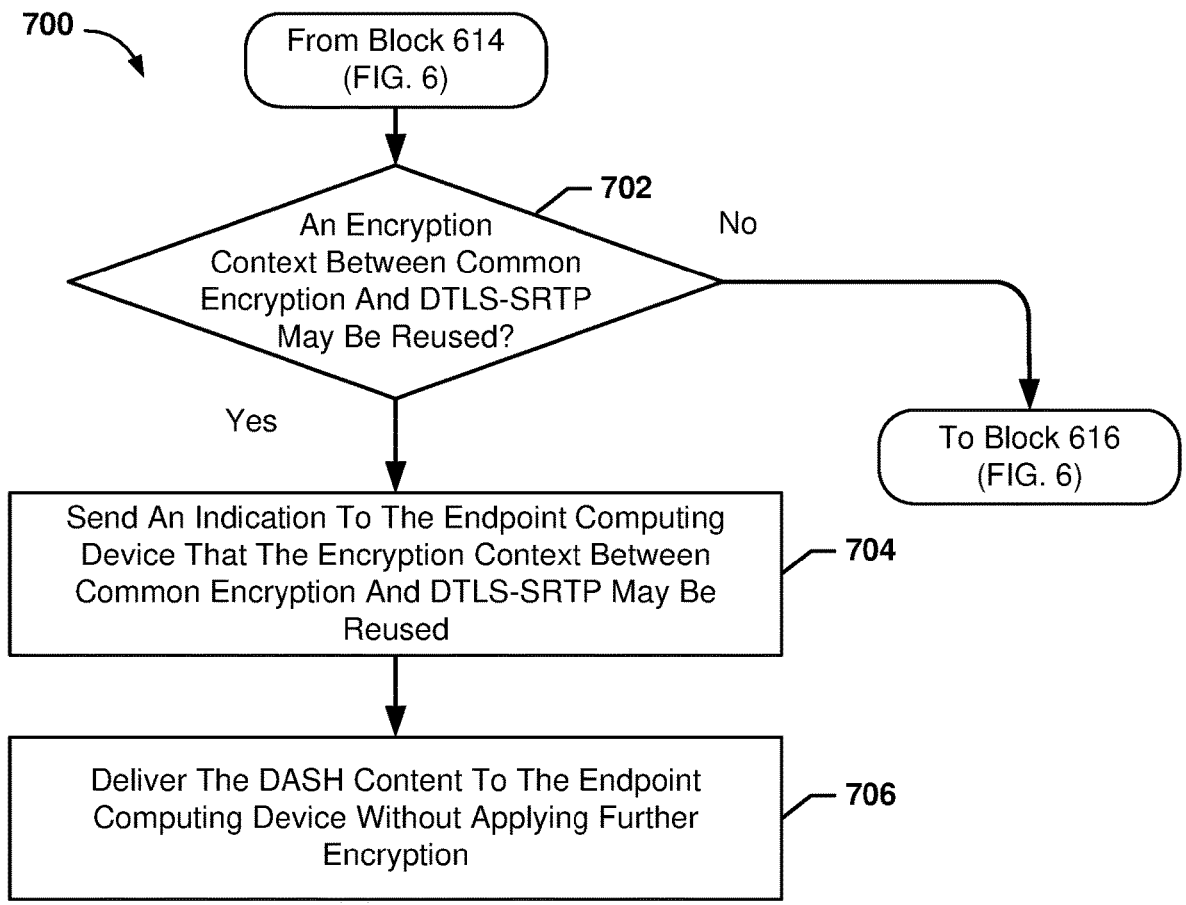
FIG. 7 is a process flow diagram illustrating a method that may be performed by a processor of a server for delivering DASH content through WebRTC in accordance with various embodiments.

FIG. 7 is a process flow diagram illustrating a method 700 that may be performed by a processor of a server for delivering DASH content through WebRTC in accordance with various embodiments. With reference to FIGS. 1A-7, the method 700 may be implemented by one or more processors of a server (e.g., 143, 405b, etc.). In various embodiments, the operations of method 700 may be performed in conjunction with the operations of methods 500 and/or 600. As an example, the operations of method 700 may be performed as part of the operations to deliver the DASH content to the endpoint computing device in block 616 of method 600.

In response to sending the acceptance message establishing the WebRTC session in block 614, the processor may perform operations including determining whether an encryption context between Common Encryption and DTLS-SRTP may be reused in the WebRTC session in determination block 702. For example, an encryption context between Common Encryption and DTLS-SRTP may be reused when a data rights management (DRM) server encrypts DASH content prior to the content being fetched by the server. Means for performing functions of the operations in block 702 may be one or more processors of a server (e.g., 143, 405b, etc.).

In response to determining that the encryption context between Common Encryption and DTLS-SRTP may not be reused in the WebRTC session (i.e., determination block 702="No"), the processor may perform the operations in block 614 of the method 600 as described.

In response to determining that the encryption context between Common Encryption and DTLS-SRTP may be reused in the WebRTC session (i.e., determination block 702="Yes"), the processor may perform operations including sending an indication to the endpoint computing device that the encryption context between Common Encryption and DTLS-SRTP may be reused in the WebRTC session in block 704. For example, the context reuse may be signaled to the endpoint computing device and an initialization vector may be reused as a salt for encryption on the WebRTC session. Means for performing functions of the operations in block 704 may be one or more processors of a server (e.g., 143, 405b, etc.).

In block 706, the processor may perform operations including delivering the DASH content to the endpoint computing device without applying further encryption. For example, the processor may perform operations including delivering the DASH content to the endpoint computing device without applying a further encryption context between Common Encryption and DTLS-SRTP. The server may send the DASH content in the WebRTC session using the encryption context with Common Encryption and DTLS-SRTP as the DASH content is originally fetched without re-encrypting the DASH content (e.g., using separate Common Encryption and DTLS-SRTP). As such, packets of the DASH content that are already encrypted (such as using Common Encryption and DTLS-SRTP or another suitable encryption) may not be re-encrypted by the server prior to sending to the endpoint computing device. Means for performing functions of the operations in block 706 may be one or more processors of a server (e.g., 143, 405b, etc.).

Figure 8:
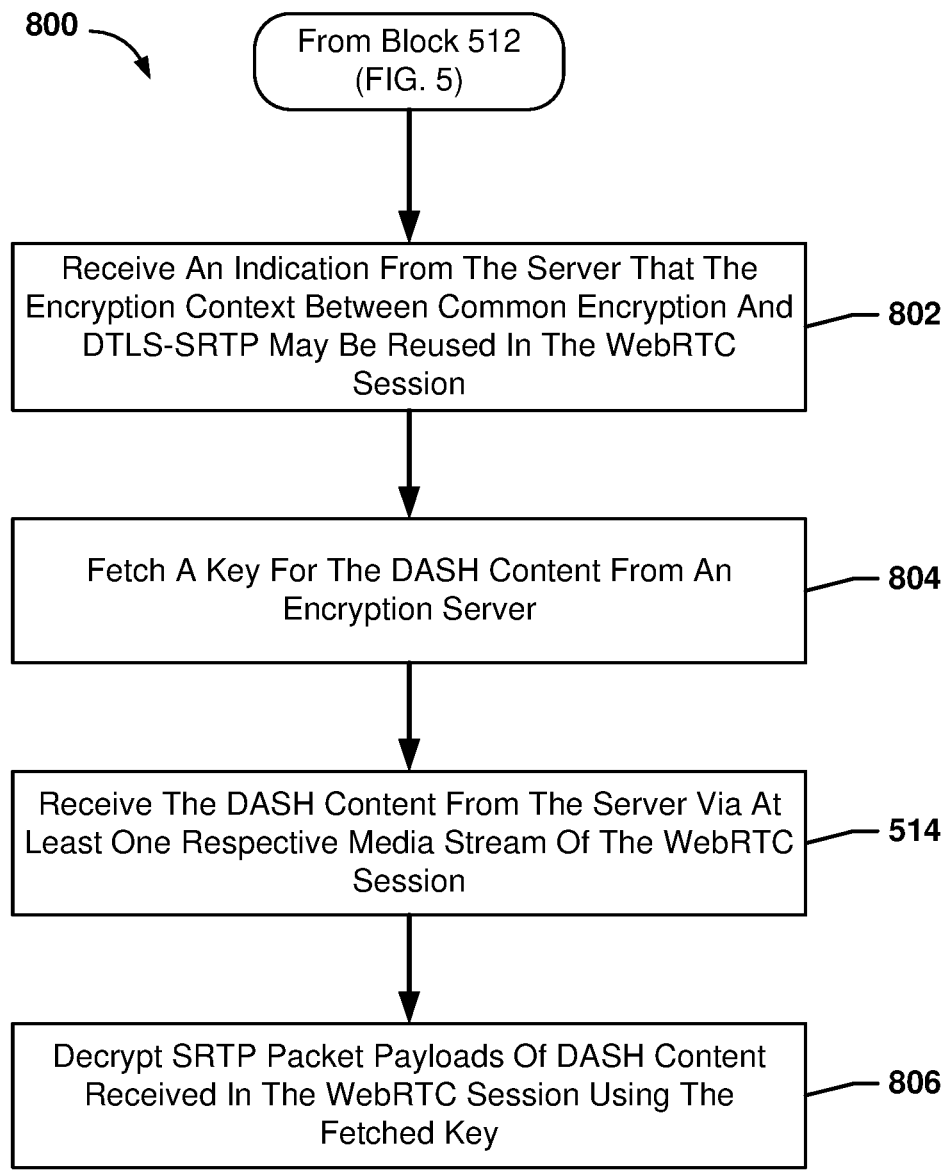
FIG. 8 is a process flow diagram illustrating a method that may be performed by a processor of an endpoint computing device for receiving DASH content through WebRTC in accordance with various embodiments.

FIG. 8 is a process flow diagram illustrating a method 800 that may be performed by a processor of an endpoint computing device for receiving DASH content through WebRTC in accordance with various embodiments. With reference to FIGS. 1A-5, the method 500 may be implemented by one or more processors (e.g., 210, 212, 214, 216, 218, 252, 260, 426) of an endpoint computing device (e.g., 120a-120e, 200, 300, 406). In various embodiments, the operations of method 800 may be performed in conjunction with the operations of methods 500, 600, and/or 700. As an example, the operations of method 800 may be performed in response to receiving an acceptance message in block 512 of method 500.

In block 802, the processor may perform operations including receiving an indication from the server that an encryption context between Common Encryption and DTLS-SRTP may be reused in the WebRTC session. For example, the context reuse may be signaled to the endpoint computing device and an initialization vector may be reused as a salt for encryption on the WebRTC session. Means for performing functions of the operations in block 802 may be one or more processors of an endpoint computing device (e.g., 120a-120e, 200, 300, 406), such as one or more of the processors 210, 212, 214, 216, 218, 252, 260, 426, and/or the wireless transceiver 266.

In block 804, the processor may perform operations including fetching a key for the DASH content from an encryption server in response to receiving the indication from the server that the encryption context between Common Encryption and DTLS-SRTP may be reused in the WebRTC session. The endpoint computing device may fetch the key from the encrypting server, such as a DRM server and use the key to decrypt the SRTP packet payload. Means for performing functions of the operations in block 804 may be one or more processors of an endpoint computing device (e.g., 120a-120e, 200, 300, 406), such as one or more of the processors 210, 212, 214, 216, 218, 252, 260, 426, and/or the wireless transceiver 266.

In block 514, the processor may perform operations to receive the DASH content as discussed with reference to method 500.

In block 806, the processor may perform operations including decrypting SRTP packet payloads of DASH content received in the WebRTC session using the fetched key. As such, packets of the DASH content that may be decrypted using the fetched key without having to use a separate key from the server sending the DASH content in the WebRTC session. Means for performing functions of the operations in block 806 may be one or more processors of an endpoint computing device (e.g., 120a-120e, 200, 300, 406), such as one or more of the processors 210, 212, 214, 216, 218, 252, 260, 426, and/or the wireless transceiver 266.

Figure 9:
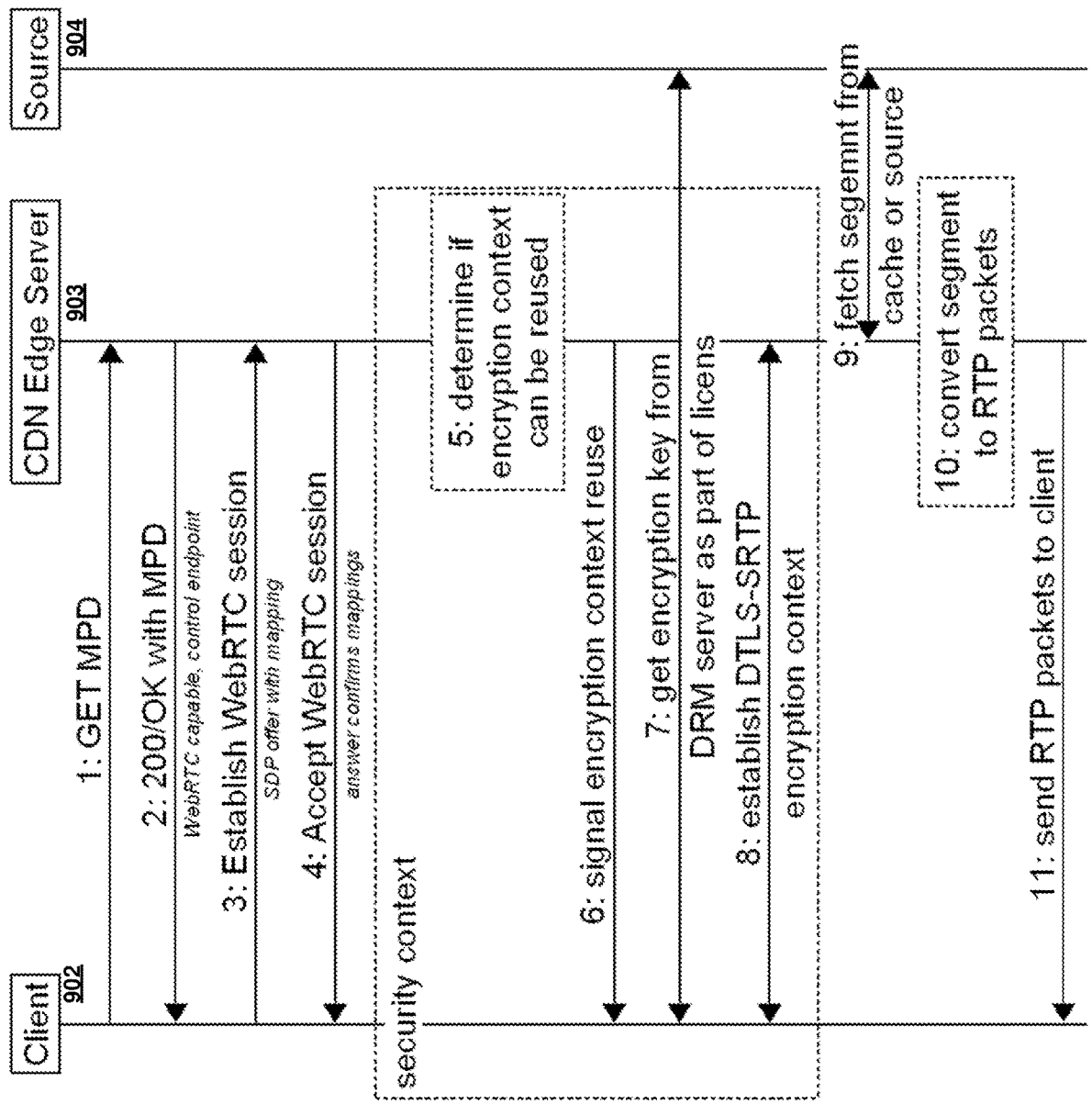
FIG. 9 is a call flow diagram illustrating a method that may be performed by a processor of a server and by a processor of an endpoint computing device for receiving DASH content through WebRTC in accordance with various embodiments.

FIG. 9 is a call flow diagram illustrating a method that may be performed by a processor of an endpoint computing device 902 (e.g., 120a-120e, 200, 300, 406) (labeled "Client" in FIG. 9) for receiving DASH content through WebRTC in accordance with various embodiments. With reference to FIGS. 1A-9, the call flow of FIG. 9 shows example interactions between a CDN edge node server 903 (e.g., 143, 405b) (labeled "CDN Edge Server" in FIG. 9) delivering DASH content through WebRTC, an endpoint computing device 902, and a source server 904 (e.g., 403) (labeled "Source" in FIG. 9). The example interactions of FIG. 9 may be example operations performed in accordance with one or more of methods 500, 600, 700, and/or 800.

In communication 1, the endpoint computing device 902 may sent a HTTP GET request for an MPD of DASH content to the CDN edge node server 903. The CDN edge node server 903 may reply in communication 2 with a HTTP response 200/OK with the MPD. The HTTP response 200/OK may include an indication the CDN edge node server 903 is WebRTC capable and indicate a control endpoint (e.g., an endpoint IP address and port). In communication 3, the endpoint computing device 902 may establish a WebRTC session by sending an SDP offer with mapping of DASH content components requested to be streamed from the CDN edge node server 903. In communication 4, the CDN edge node server 903 may send an acceptance message for the WebRTC session as an answer to the endpoint computing device 902. The acceptance may include an object indicating a mapping between each respective media stream of the WebRTC session and that respective media stream's assigned DASH component for the DASH content.

In communication 5, the CDN edge node server 903 may determine encryption context may be reused. In communication 6, the CDN edge node server 903 may signal encryption context reuse to the endpoint computing device 902. In communication 7, the endpoint computing device 902 may get an encryption key from the source server (e.g., a DRM server providing the key as part of the DASH content licensing). In communication 8, the endpoint computing device 902 and the CDN edge node server 903 may establish a DTLS-SRTP encryption context. In communication 9, the CDN edge node server 903 may fetch the DASH segments from a cache or the source server 904. In communication 10, the CDN edge node server 903 may convert the DASH segments to RTP packets. In communication 11, the CDN edge node server 903 may send the RTP packets to the endpoint computing device 902.

Figure 10:
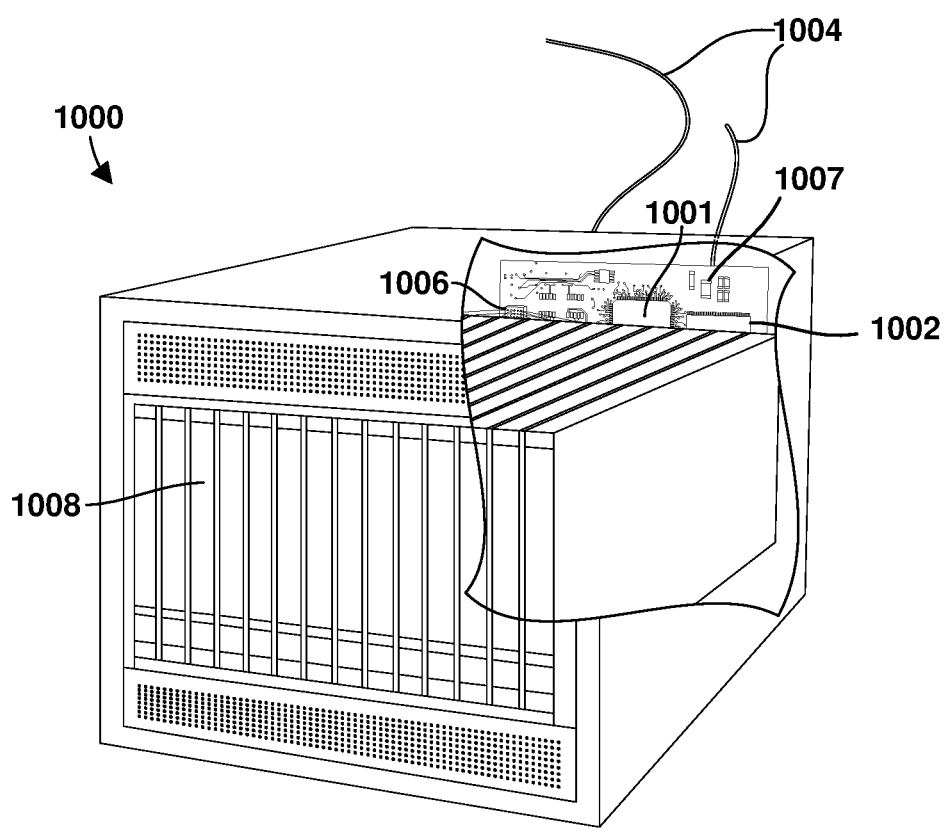
FIG. 10 is a component block diagram of a network computing device suitable for use with various embodiments.

FIG. 10 is a component block diagram of a network computing device 1000, such as a server, suitable for use with various embodiments. With reference to FIGS. 1A-10, various embodiments may be implemented on a variety of network computing devices 1000 (e.g., base station 110a-e, 350, server 143, CDN edge node server 405a-405c, CDN node server 404a-404b, source server 403, 904, etc.), an example of which is illustrated in FIG. 10 in the form of a server. Such network computing devices may include at least the components illustrated in FIG. 10. The network computing device 1000 may include a processor 1001 coupled to volatile memory 1002 and a large capacity nonvolatile memory, such as a disk drive 1008. The network computing device 1000 may also include a peripheral memory access device such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional access ports, such as USB, Firewire, Thunderbolt, and the like for coupling to peripherals, external memory, or other devices.

Figure 11:
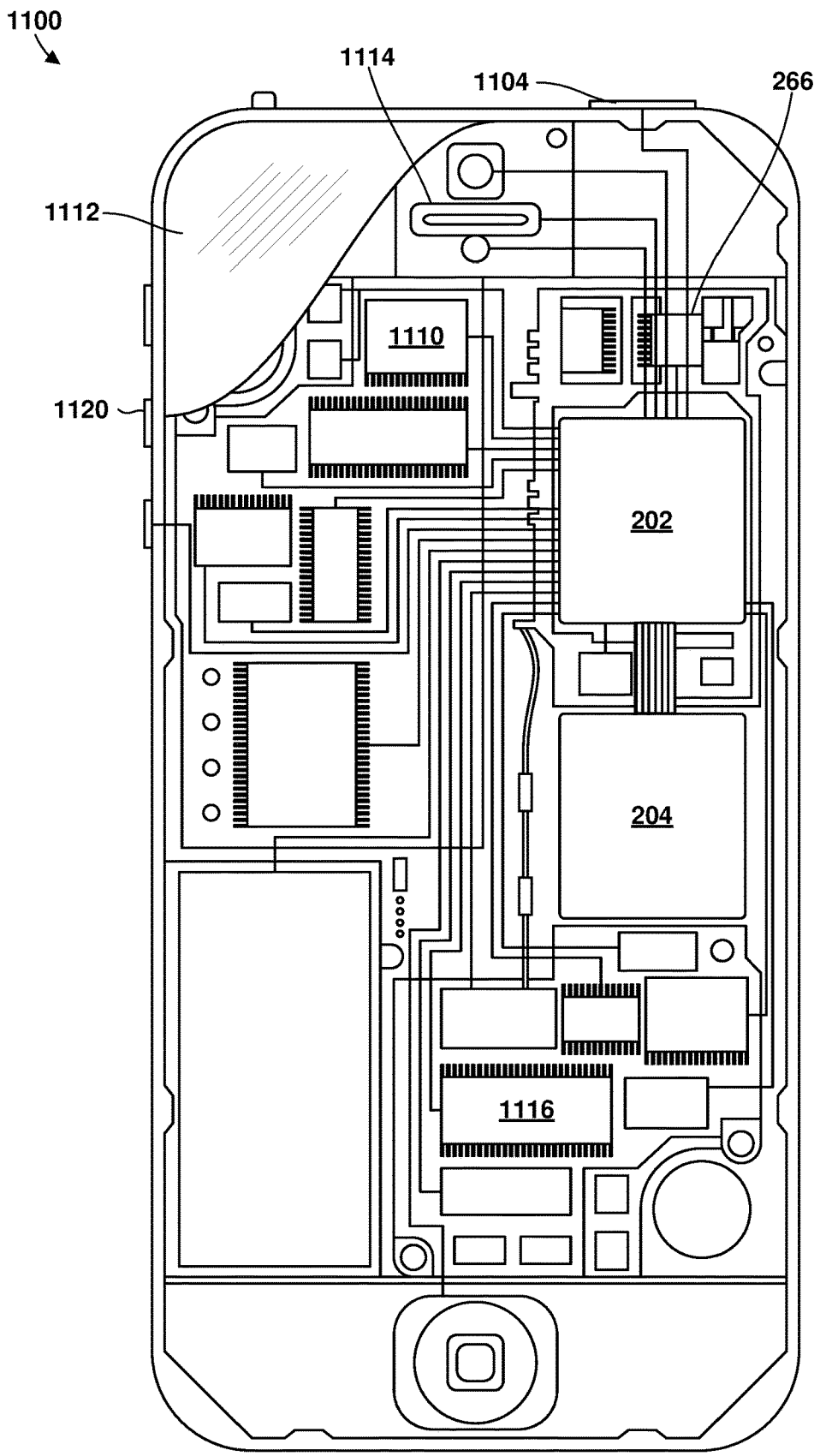
FIG. 11 is a component block diagram of a computing device suitable for use with various embodiments.

FIG. 11 is a component block diagram of a computing device, such as an endpoint computing device, suitable for use with various embodiments. With reference to FIGS. 1A-11, various embodiments may be implemented on a variety of computing devices, such as endpoint computing devices (e.g., UEs 120a-120e, wireless devices 200, 320, endpoint computing device 406, 902, etc.), an example of which is illustrated in FIG. 11 in the form of a wireless device 1100. The wireless device 1100 may include a first SOC 202 (e.g., a SOC-CPU) coupled to a second SOC 204 (e.g., a 5G capable SOC). The first and second SOCs 202, 204 may be coupled to internal memory 1116, a display 1112, and to a speaker 1114. Additionally, the wireless device 1100 may include an antenna 1104 for sending and receiving electromagnetic radiation that may be connected to a wireless transceiver 266 coupled to one or more processors in the first and/or second SOCs 202, 204. The wireless device 1100 may also include menu selection buttons or rocker switches 1120 for receiving user inputs.

The wireless device 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1110 may include a digital signal processor (DSP) circuit (not shown separately).

The processors of the network computing device 1000 and the wireless device 1100 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, and/or 800 may be substituted for or combined with one or more operations of the methods 500, 600, 700, and/or 800.

Implementation examples are described in the following paragraphs. While some of the following implementation examples are described in terms of example methods, further example implementations may include: the example methods discussed in the following paragraphs implemented by a computing device including a processor configured to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method performed by a processor of an endpoint computing device for receiving Dynamic Adaptive Streaming Over Hypertext Transfer Protocol (DASH) content through Web Real-Time Communication (WebRTC), including: sending a request to a server for a manifest file for DASH content, and receiving a reply to the request from the server, the reply including the manifest file for the DASH content and an indication that WebRTC is available for use in delivering the DASH content.

Example 2. The method of example 1, further including: determining one or more DASH content components for the DASH content to be consumed based at least in part on parsing the manifest file, selecting WebRTC for receiving the one or more DASH content components for the DASH content based at least in part on the indication that WebRTC is available for use in delivering the DASH content, and sending an offer to establish a WebRTC session to the server including an indication of the one or more DASH content components for the DASH content.

Example 3. The method of example 2, further including: receiving an acceptance message establishing the WebRTC session from the server, in which the acceptance message includes an object indicating a mapping between each respective media stream of the WebRTC session and that respective media stream's assigned one of the one or more DASH components for the DASH content.

Example 4. The method of example 3, further including: receiving the DASH content from the server via at least one respective media stream of the WebRTC session.

Example 5. The method of any of examples 1-4, in which the offer to establish the WebRTC session further includes an indication of the one or more streaming attributes.

Example 6. The method of example 5, in which the one or more streaming attributes are one or more of a bandwidth, a width, a height, a frame rate, a codec, and a file type.

Example 7. The method of any of examples 1-6, in which the indication that WebRTC is available for use in delivering the DASH content includes an indication that the server is WebRTC capable and an indication of a signaling endpoint to use in a WebRTC session.

Example 8. The method of example 7, in which the indication that WebRTC is available for use in delivering the DASH content further includes an indication of a signaling protocol to use for establishing the WebRTC session.

Example 9. The method of any of examples 1-8, in which the one or more DASH content components for the DASH content are one or more AdaptationSets for the DASH content.

Example 10. The method of any of examples 1-9, in which the manifest file for DASH content is a Media Presentation Description.

Example 11. The method of any of examples 1-10, further including: receiving an indication from the server that an encryption context between Common Encryption and Datagram Transport Layer Security (DTLS) for the Secure Realtime Protocol (SRTP) (DTLS-SRTP) may be reused in the WebRTC session, fetching a key for the DASH content from an encryption server in response to receiving the indication from the server that the encryption context between Common Encryption and DTLS-SRTP may be reused in the WebRTC session, and decrypting SRTP packet payloads of DASH content received in the WebRTC session using the fetched key.

Example 12. A method performed by a processor of a server for delivering Dynamic Adaptive Streaming Over Hypertext Transfer Protocol (DASH) content through Web Real-Time Communication (WebRTC), including: sending a reply to a request from an endpoint computing device for a manifest file for DASH content, in which the reply includes the manifest file for the DASH content and an indication that WebRTC is available for use in delivering the DASH content.

Example 13. The method of example 12, in which the indication that WebRTC is available for use in delivering the DASH content includes an indication that the server is WebRTC capable and an indication of a signaling endpoint to use in a WebRTC session.

Example 14. The method of example 13, in which the indication that WebRTC is available for use in delivering the DASH content further includes an indication of a signaling protocol to use for establishing the WebRTC session.

Example 15. The method of any of examples 12-14, further including: receiving an offer to establish a WebRTC session from the endpoint computing device including an indication of one or more DASH content components for the DASH content, establishing the WebRTC session including a respective media stream for each of the indicated one or more DASH components for the DASH content, generating an object indicating a mapping between each respective media stream of the WebRTC session and that respective media stream's assigned DASH component for the DASH content, and sending an acceptance message establishing the WebRTC session to the endpoint computing device, in which the acceptance message includes the object indicating the mapping.

Example 16. The method of example 15, further including: delivering the DASH content to the endpoint computing device using at least one respective media stream of the WebRTC session.

Example 17. The method of any of examples 15-16, in which the offer to establish the WebRTC session from the endpoint computing device further includes an indication of one or more streaming attributes.

Example 18. The method of example 17, in which the one or more streaming attributes are one or more of a bandwidth, a width, a height, a frame rate, a codec, and a file type.

Example 19. The method of any of examples 15-18, in which the one or more DASH content components for the DASH content are one or more AdaptationSets for the DASH content.

Example 20. The method of any of examples 12-19, in which the manifest file for DASH content is a Media Presentation Description.

Example 21. The method of any of examples 12-20, further including: determining whether an encryption context between Common Encryption and Datagram Transport Layer Security (DTLS) for the Secure Realtime Protocol (SRTP) (DTLS-SRTP) may be reused in the WebRTC session, and in response to determining that the encryption context between Common Encryption and DTLS-SRTP may be reused in the WebRTC session: sending an indication to the endpoint computing device that the encryption context between Common Encryption and DTLS-SRTP may be reused in the WebRTC session, and delivering the DASH content to the endpoint computing device without applying further encryption.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of an endpoint computing device for receiving Dynamic Adaptive Streaming Over Hypertext Transfer Protocol (DASH) content through Web Real-Time Communication (WebRTC), comprising:
    sending a request to a server for a manifest file for DASH content, which is content formatted for streaming based on DASH;
    receiving a reply to the request from the server, the reply including the manifest file for the DASH content and an indication that WebRTC is available for use in delivering the DASH content;
    determining one or more DASH content components for the DASH content to be consumed based at least in part on parsing the manifest file;
    selecting WebRTC for receiving the one or more DASH content components for the DASH content based at least in part on the indication that WebRTC is available for use in delivering the DASH content; and
    sending an offer to establish a WebRTC session to the server, the offer including an indication of the one or more DASH content components for the DASH content.

2. The method of claim 1, further comprising:
    receiving an acceptance message establishing the WebRTC session from the server, wherein the acceptance message includes an object indicating a mapping between each respective media stream of the WebRTC session and that respective media stream's assigned one of the one or more DASH content components for the DASH content.

3. The method of claim 2, further comprising:
    receiving the DASH content from the server via at least one respective media stream of the WebRTC session.

4. The method of claim 1, wherein the offer to establish the WebRTC session further includes an indication of one or more streaming attributes.

5. The method of claim 4, wherein the one or more streaming attributes comprise one or more of a bandwidth, a width, a height, a frame rate, a codec, and a file type.

6. The method of claim 1, wherein the indication that WebRTC is available for use in delivering the DASH content comprises an indication that the server is WebRTC capable and an indication of a signaling endpoint to use in a WebRTC session.

7. The method of claim 6, wherein the indication that WebRTC is available for use in delivering the DASH content further comprises an indication of a signaling protocol to use for establishing the WebRTC session.

8. The method of claim 1, wherein the one or more DASH content components for the DASH content comprise one or more AdaptationSets for the DASH content.

9. The method of claim 1, wherein the manifest file for DASH content is a Media Presentation Description.

10. The method of claim 1, further comprising:
    receiving an indication from the server that an encryption context between Common Encryption and Datagram Transport Layer Security (DTLS) for the Secure Real-time Protocol (SRTP) (DTLS-SRTP) may be reused in a WebRTC session;
    fetching a key for the DASH content from an encryption server in response to receiving the indication from the server that the encryption context between Common Encryption and DTLS-SRTP may be reused in the WebRTC session; and
    decrypting SRTP packet payloads of DASH content received in the WebRTC session using the fetched key.

11. A method performed by a processor of a server for delivering Dynamic Adaptive Streaming Over Hypertext Transfer Protocol (DASH) content through Web Real-Time Communication (WebRTC), comprising:
sending a reply to a request from an endpoint computing device for a manifest file for DASH content, which is content formatted for streaming based on DASH;
wherein the reply includes the manifest file for the DASH content and an indication that WebRTC is available for use in delivering the DASH content; and
wherein the indication that WebRTC is available for use in delivering the DASH content comprises an indication that the server is WebRTC capable and an indication of a signaling endpoint to use in a WebRTC session.

12. The method of claim 11, wherein the indication that WebRTC is available for use in delivering the DASH content further comprises an indication of a signaling protocol to use for establishing the WebRTC session.

13. The method of claim 11, further comprising:
receiving an offer to establish a WebRTC session from the endpoint computing device, the offer including an indication of one or more DASH content components for the DASH content;
establishing the WebRTC session including a respective media stream for each of the indicated one or more DASH content components for the DASH content;
generating an object indicating a mapping between each respective media stream of the WebRTC session and that respective media stream's indicated DASH content components for the DASH content; and
sending an acceptance message establishing the WebRTC session to the endpoint computing device, wherein the acceptance message includes the object indicating the mapping.

14. The method of claim 13, further comprising:
delivering the DASH content to the endpoint computing device using at least one respective media stream of the WebRTC session.

15. The method of claim 13, wherein the offer to establish the WebRTC session from the endpoint computing device further includes an indication of one or more streaming attributes.

16. The method of claim 15, wherein the one or more streaming attributes comprise one or more of a bandwidth, a width, a height, a frame rate, a codec, and a file type.

17. The method of claim 13, wherein the one or more DASH content components for the DASH content comprise one or more AdaptationSets for the DASH content.

18. The method of claim 11, wherein the manifest file for DASH content is a Media Presentation Description.

19. The method of claim 11, further comprising:
determining whether an encryption context between Common Encryption and Datagram Transport Layer Security (DTLS) for the Secure Realtime Protocol (SRTP) (DTLS-SRTP) may be reused in a WebRTC session; and
in response to determining that the encryption context between Common Encryption and DTLS-SRTP may be reused in the WebRTC session:
sending an indication to the endpoint computing device that the encryption context between Common Encryption and DTLS-SRTP may be reused in the WebRTC session; and
delivering the DASH content to the endpoint computing device without applying further encryption.

20. An endpoint computing device, comprising:
a processor configured with processor-executable instructions to:
send a request to a server for a manifest file for Dynamic Adaptive Streaming Over Hypertext Transfer Protocol (DASH) content, which is content formatted for streaming based on DASH;
receive a reply to the request from the server, the reply including the manifest file for the DASH content and an indication that Web Real-Time Communication (WebRTC) is available for use in delivering the DASH content;
determine one or more DASH content components for the DASH content to be consumed based at least in part on parsing the manifest file;
select WebRTC for receiving the one or more DASH content components for the DASH content based at least in part on the indication that WebRTC is available for use in delivering the DASH content; and
send an offer to establish a WebRTC session to the server, the offer including an indication of the one or more DASH content components for the DASH content.

21. The endpoint computing device of claim 20, wherein the processor is further configured with processor-executable instructions to:
receive an acceptance message establishing the WebRTC session from the server, wherein the acceptance message includes an object indicating a mapping between each respective media stream of the WebRTC session and that respective media stream's assigned one of the one or more DASH content components for the DASH content.

22. The endpoint computing device of claim 21, wherein the processor is further configured with processor-executable instructions:
receive the DASH content from the server via at least one respective media stream of the WebRTC session.

23. A server, comprising:
a processor configured with processor-executable instructions to:
send a reply to a request from an endpoint computing device for a manifest file for Dynamic Adaptive Streaming Over Hypertext Transfer Protocol (DASH) content, which is content formatted for streaming based on DASH;
wherein the reply includes the manifest file for the DASH content and an indication that Web Real-Time Communication (WebRTC) is available for use in delivering the DASH content; and
wherein the indication that WebRTC is available for use in delivering the DASH content comprises an indication that the server is WebRTC capable and an indication of a signaling endpoint to use in a WebRTC session.

24. The server of claim 23, wherein the processor is further configured with processor-executable instructions such that the indication that WebRTC is available for use in delivering the DASH content further comprises an indication of a signaling protocol to use for establishing the WebRTC session.

25. The server of claim 23, wherein the processor is further configured with processor-executable instructions to:
receive an offer to establish a WebRTC session from the endpoint computing device, the offer including an indication of one or more DASH content components for the DASH content;

establish the WebRTC session including a respective media stream for each of the indicated one or more DASH content components for the DASH content;

generate an object indicating a mapping between each respective media stream of the WebRTC session and that respective media stream's assigned DASH component for the DASH content; and send an acceptance message establishing the WebRTC session to the endpoint computing device, wherein the acceptance message includes the object indicating the mapping.

26. The server of claim 25, wherein the processor is further configured with processor-executable instructions to:

deliver the DASH content to the endpoint computing device using at least one respective media stream of the WebRTC session.

\* \* \* \* \*